(12) United States Patent
Hashimoto et al.

(10) Patent No.: US 12,289,471 B2
(45) Date of Patent: Apr. 29, 2025

(54) IMAGE DECODING APPARATUS AND IMAGE CODING APPARATUS

(71) Applicant: SHARP KABUSHIKI KAISHA, Sakai (JP)

(72) Inventors: Tomonori Hashimoto, Sakai (JP); Eiichi Sasaki, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/426,311

(22) Filed: Jan. 29, 2024

(65) Prior Publication Data

US 2024/0171777 A1     May 23, 2024

Related U.S. Application Data

(63) Continuation of application No. 18/136,818, filed on Apr. 19, 2023, now Pat. No. 11,949,914, which is a (Continued)

(30) Foreign Application Priority Data

Feb. 21, 2020    (JP) ................................. 2020-028529

(51) Int. Cl.
*H04N 19/60*         (2014.01)
*H04N 19/132*      (2014.01)
(Continued)

(52) U.S. Cl.
CPC ........... *H04N 19/60* (2014.11); *H04N 19/132* (2014.11); *H04N 19/176* (2014.11); *H04N 19/70* (2014.11)

(58) Field of Classification Search
CPC ...... H04N 19/157; H04N 19/70; H04N 19/12; H04N 19/132; H04N 19/60; H04N 19/176

See application file for complete search history.

(56) References Cited

U.S. PATENT DOCUMENTS

2013/0294524 A1    11/2013    Van Der Auwera et al.
2016/0269730 A1    9/2016    Jeon et al.
(Continued)

OTHER PUBLICATIONS

Benjamin Bross et al., "Versatile Video Coding (Draft 8)", JVET-Q2001-v8 Joint Video Experts Team (JVET) of ITU-T SG 16 WP 3 and ISO/IEC JTC 1/SC 29/WG 11, 17th Meeting: Brussels, BE, Jan. 7-17, 2020.
(Continued)

*Primary Examiner* — Neil R Mikeska
(74) *Attorney, Agent, or Firm* — ScienBiziP, P.C.

(57) ABSTRACT

An image decoding apparatus including a header decoder configured to decode, from coded data, a flag indicating whether dependent quantization is enabled and a flag prohibiting transform skip residual quantization, and a TU decoder configured to decode a transform coefficient in a TU block in an RRC mode in which a LAST position is coded, the LAST position corresponding to a decoding start position for the transform coefficient, or a TSRC mode in which the LAST position is not coded. The TU decoder performs dependent quantization in the RRC mode in a case that the transform coefficient for transform skip is decoded in the TSRC mode, and does not perform dependent quantization in the RRC mode in a case that the transform coefficient for transform skip is decoded in the RRC mode.

3 Claims, 24 Drawing Sheets

Related U.S. Application Data continuation of application No. 17/710,172, filed on Mar. 31, 2022, now Pat. No. 11,671,626, which is a continuation of application No. 17/179,016, filed on Feb. 18, 2021, now Pat. No. 11,336,917.

(51) Int. Cl.
  *H04N 19/176* (2014.01)
  *H04N 19/70* (2014.01)

(56) References Cited

U.S. PATENT DOCUMENTS

| | | |
|---|---|---|
| 2016/0330481 A1 | 11/2016 | Zhang et al. |
| 2017/0272782 A1 | 9/2017 | Li et al. |
| 2021/0092394 A1 | 3/2021 | Tsai et al. |
| 2021/0185357 A1 | 6/2021 | Tsukuba |

OTHER PUBLICATIONS

Tomonori Hashimoto et al., "Disabling Dependent Quantization and Sign Data Hiding in Transform Skip blocks", JVET-R0141_r2 Joint Video Experts Team (JVET) of ITU-T SG 16 WP 3 and ISO/IEC JTC 1/SC 29/WG 11, 18th Meeting: by teleconference, Apr. 15-24, 2020.

Benjamin Bross et al., "Versatile Video Coding (Draft 8)", JVET-Q2001-vC Joint Video Experts Team (JVET) of ITU-T SG 16 WP 3 and ISO/IEC JTC 1/SC 29/WG 11, 17th Meeting: Brussels, BE, Jan. 7-17, 2020.

Non-Final Rejection of U.S. Appl. No. 17/179,016 issued on Oct. 13, 2021.

Notice of Allowance of U.S. Appl. No. 17/179,016 issued on Jan. 4, 2022.

Notice of Allowance of U.S. Appl. No. 17/710,172 issued on Feb. 15, 2023.

Notice of Allowance of U.S. Appl. No. 18/136,818 issued on Nov. 27, 2023.

FIG. 9A

| seq_parameter_set_rbsp( ) { | Descriptor |
|---|---|
| sps_seq_parameter_set_id | u(4) |
| sps_video_parameter_set_id | u(4) |
| ... | ... |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| ... | ... |
| if( sps_transform_skip_enabled_flag  ||  sps_palette_enabled_flag ) | |
|   min_qp_prime_ts_minus4 | ue(v) |
| ... | ... |
| sps_dep_quant_enabled_flag | u(1) |
| if( !sps_dep_quant_enabled_flag ) | |
|   sps_sign_data_hiding_enabled_flag | u(1) |
| ... | ... |
| } | |

FIG. 9B

| picture_header_structure( ) { | Descriptor |
|---|---|
| ... | ... |
| if( sps_dep_quant_enabled_flag ) | |
|   ph_dep_quant_enabled_flag | u(1) |
| if( sps_sign_data_hiding_enabled_flag  &&  !ph_dep_quant_enabled_flag ) | |
|   pic_sign_data_hiding_enabled_flag | u(1) |
| ... | ... |
| } | |

FIG. 10A

| slice_header( ) { | Descriptor |
|---|---|
| picture_header_in_slice_header_flag | u(1) |
| if( picture_header_in_slice_header_flag ) | |
|   picture_header_structure( ) | |
| ... | ... |
| slice_ts_residual_coding_disabled_flag | u(1) |
| ... | ... |
| } | |

FIG. 10B

| transform_unit( x0, y0, tbWidth, tbHeight, treeType, subTuIndex, chType ) { | Descriptor |
|---|---|
| ... | ... |
| if( tu_cbf_luma[ x0 ][ y0 ] && treeType != DUAL_TREE_CHROMA ) { | |
|   if( sps_transform_skip_enabled_flag && !BdpcmFlag[ x0 ][ y0 ][ 0 ] && <br>     tbWidth <= MaxTsSize && tbHeight <= MaxTsSize && <br>     ( IntraSubPartitionsSplitType = = ISP_NO_SPLIT ) && !cu_sbt_flag ) | |
|     transform_skip_flag[ x0 ][ y0 ][ 0 ] | ae(v) |
|   if(!transform_skip_flag[x0][y0][0] \|\| slice_ts_residual_coding_disabled_flag) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| ... | ... |
| } | |

| residual_coding( x0, y0, log2TbWidth, log2TbHeight, cIdx ) { | Descriptor |
|---|---|
| ... | |
| QState = 0 | |
| for( i = lastSubBlock; i >= 0; i- - ) { | |
|   startQStateSb = QState | |
|   xS = DiagScanOrder[ log2TbWidth - log2SbW ][ log2TbHeight - log2SbH ][ i ][ 0 ] | |
|   yS = DiagScanOrder[ log2TbWidth - log2SbW ][ log2TbHeight - log2SbH ][ i ][ 1 ] | |
|   ... | |
|   if( i < lastSubBlock && i > 0 ) { | |
|     coded_sub_block_flag[ xS ][ yS ] | ae(v) |
|     ... | |
|   } | |
|   ... | |
|   firstSigScanPosSb = numSbCoeff | |
|   lastSigScanPosSb = -1 | |
|   ... | |
|   for( n = firstPosMode0; n >= 0 && remBinsPass1 >= 4; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) && | |
|       ( xC != LastSignificantCoeffX \|\| yC != Last SignificantCoeffY ) ) { | |
|       sig_coeff_flag[ xC ][ yC ] | ae(v) |
|       ... | |
|     } | |
|     if( sig_coeff_flag[ xC ][ yC ] ) { | |
|       abs_level_gtx_flag[ n ][ 0 ] | ae(v) |
|       ... | |
|       if( abs_level_gtx_flag[ n ][ 0 ] ) { | |
|         par_level_flag[ n ] | ae(v) |
|         ... | |
|         abs_level_gtx_flag[ n ][ 1 ] | ae(v) |
|         ... | ... |
|       } | |
|     if( lastSigScanPosSb = = -1 ) | |
|       lastSigScanPosSb = n | |
|     firstSigScanPosSb = n | |
|   } | |

FIG. 11A

| | |
|---|---|
| AbsLevelPass1[ xC ][ yC ] = sig_coeff_flag[ xC ][ yC ] + par_level_flag[ n ] +<br>        abs_level_gtx_flag[ n ][ 0 ] + 2 * abs_level_gtx_flag[ n ][ 1 ] | |
|   if( ph_dep_quant_enabled_flag ) | |
|     QState = QStateTransTable[ QState ][ AbsLevelPass1[ xC ][ yC ] & 1 ] | |
|   firstPosMode1 = n − 1 | |
| } | |
| for( n = firstPosMode0; n > firstPosMode1; n− − ) { | |
|   xC = ( xS  <<  log2SbW ) + DiagScanOrder[ log2SbW ][ log2SbH ][ n ][ 0 ] | |
|   yC = ( yS  <<  log2SbH ) + DiagScanOrder[ log2SbW ][ log2SbH ][ n ][ 1 ] | |
|   if( abs_level_gtx_flag[ n ][ 1 ] ) | |
|     abs_remainder[ n ] | ae(v) |
|   AbsLevel[ xC ][ yC ] = AbsLevelPass1[ xC ][ yC ] +2 * abs_remainder[ n ] | |
| } | |
| for( n = firstPosMode1; n  >=  0; n− − ) { | |
|   xC = ( xS  <<  log2SbW ) + DiagScanOrder[ log2SbW ][ log2SbH ][ n ][ 0 ] | |
|   yC = ( yS  <<  log2SbH ) + DiagScanOrder[ log2SbW ][ log2SbH ][ n ][ 1 ] | |
|   if( coded_sub_block_flag[ xS ][ yS ] ) | |
|     dec_abs_level[ n ] | ae(v) |
|   if( AbsLevel[ xC ][ yC ] > 0 ) { | |
|     if( lastSigScanPosSb  = =  −1 ) | |
|       lastSigScanPosSb = n | |
|     firstSigScanPosSb = n | |
|   } | |
|   if( ph_dep_quant_enabled_flag ) | |
|     QState = QStateTransTable[ QState ][ AbsLevel[ xC ][ yC ] & 1 ] | |
| } | |
| if( ph_dep_quant_enabled_flag  ||  !pic_sign_data_hiding_enabled_flag ) | |
|   signHidden = 0 | |
| else | |
|   signHidden = ( lastSigScanPosSb − firstSigScanPosSb > 3 ? 1 : 0 ) | |
| for( n = numSbCoeff − 1; n  >=  0; n− − ) { | |
|   xC = ( xS  <<  log2SbW ) + DiagScanOrder[ log2SbW ][ log2SbH ][ n ][ 0 ] | |
|   yC = ( yS  <<  log2SbH ) + DiagScanOrder[ log2SbW ][ log2SbH ][ n ][ 1 ] | |
|   if( (AbsLevel[ xC ][ yC ] > 0 ) && (!signHidden || ( n != firstSigScanPosSb) ) ) | |
|     coeff_sign_flag[ n ] | ae(v) |
| } | |

FIG. 11B

```
if( ph_dep_quant_enabled_flag ) {
  QState = startQStateSb
  for( n = numSbCoeff - 1; n >= 0; n-- ) {
    xC = ( xS  <<  log2SbW ) + DiagScanOrder[ log2SbW ][ log2SbH ][ n ][ 0 ]
    yC = ( yS  <<  log2SbH ) + DiagScanOrder[ log2SbW ][ log2SbH ][ n ][ 1 ]
    if( AbsLevel[ xC ][ yC ] > 0 )
      TransCoeffLevel[ x0 ][ y0 ][ cIdx ][ xC ][ yC ] =
        ( 2 * AbsLevel[ xC ][ yC ] - ( QState > 1 ? 1 : 0 ) ) *
        ( 1 - 2 * coeff_sign_flag[ n ] )
    QState = QStateTransTable[ QState ][ AbsLevel[ xC ][ yC ] & 1 ]
} else {
  sumAbsLevel = 0
  for( n = numSbCoeff - 1; n >= 0; n-- ) {
    xC = ( xS  <<  log2SbW ) + DiagScanOrder[ log2SbW ][ log2SbH ][ n ][ 0 ]
    yC = ( yS  <<  log2SbH ) + DiagScanOrder[ log2SbW ][ log2SbH ][ n ][ 1 ]
    if( AbsLevel[ xC ][ yC ] > 0 ) {
      TransCoeffLevel[ x0 ][ y0 ][ cIdx ][ xC ][ yC ] =
        AbsLevel[ xC ][ yC ] * ( 1 - 2 * coeff_sign_flag[ n ] )
      if( signHidden ) {
        sumAbsLevel += AbsLevel[ xC ][ yC ]
        if( ( n == firstSigScanPosSb ) && ( sumAbsLevel % 2 ) == 1 ) )
          TransCoeffLevel[ x0 ][ y0 ][ cIdx ][ xC ][ yC ] =
            -TransCoeffLevel[ x0 ][ y0 ][ cIdx ][ xC ][ yC ]
      }
    }
  }
 }
}
```

← SYN1101

← SYN1102

FIG. 11C

| residual_ts_coding( x0, y0, log2TbWidth, log2TbHeight, cIdx ) { | Descriptor |
|---|---|
| ... | ... |
|   for( i =0; i <= lastSubBlock; i++ ) { | |
|     xS = DiagScanOrder[ log2TbWidth - log2SbW ][ log2TbHeight - log2SbH ][ i ][ 0 ] | |
|     yS = DiagScanOrder[ log2TbWidth - log2SbW ][ log2TbHeight - log2SbH ][ i ][ 1 ] | |
|     if( i != lastSubBlock \|\| !inferSbCbf ) | |
|       coded_sub_block_flag[ xS ][ yS ] | ae(v) |
|     ... | ... |
|   /* First scan pass */ | |
|   ... | ... |
|     lastScanPosPass1 = -1 | |
|     for( n = 0; n <= numSbCoeff - 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if(coded_sub_block_flag[xS][yS] && (n!=numSbCoeff-1 \|\| !inferSbSigCoeffFlag)) { | |
|         sig_coeff_flag[ xC ][ yC ] | ae(v) |
|         ... | ... |
|       } | |
|       if( sig_coeff_flag[ xC ][ yC ] { | |
|         coeff_sign_flag[ n ] | ae(v) |
|         ... | ... |
|         abs_level_gtx_flag[ n ][ 0 ] | ae(v) |
|         ... | ... |
|         if( abs_level_gtx_flag[ n ][ 0 ] ) { | |
|           par_level_flag[ n ] | ae(v) |
|           ... | ... |
|         } | |
|       } | |
|       AbsLevelPass1[ xC ][ yC ] = <br>        sig_coeff_flag[xC][yC] + par_level_flag[n] + abs_level_gtx_flag[n][0] | |
|       lastScanPosPass1 = n | |
|     } | |
|   /* Greater than X scan pass (numGtXFlags=5) */ | |
|     lastScanPosPass2 = -1 | |
|     for( n = 0; n <= numSbCoeff - 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       AbsLevelPass2[ xC ][ yC ] = AbsLevelPass1[ xC ][ yC ] | |

FIG. 12A

| | |
|---|---|
| `    for( j = 1; j < 5; j++ ) {` | |
| `        if( abs_level_gtx_flag[ n ][ j - 1 ] ) {` | |
| `            abs_level_gtx_flag[ n ][ j ]` | ae(v) |
| `            ...` | ... |
| `        }` | |
| `        AbsLevelPass2[ xC ][ yC ] += 2 * abs_level_gtx_flag[ n ][ j ]` | |
| `    }` | |
| `    lastScanPosPass2 = n` | |
| `}` | |
| `/* remainder scan pass */` | |
| `for( n = 0; n <= numSbCoeff - 1; n++ ) {` | |
| `    xC = ( xS << log2SbW ) + DiagScanOrder[ log2SbW ][ log2SbH ][ n ][ 0 ]` | |
| `    yC = ( yS << log2SbH ) + DiagScanOrder[ log2SbW ][ log2SbH ][ n ][ 1 ]` | |
| `    if( ( n <= lastScanPosPass2 && AbsLevelPass2[ xC ][ yC ] >= 10 ) ||`<br>`        ( n > lastScanPosPass2 && n <= lastScanPosPass1 && AbsLevelPass1[ xC ][ yC ] >= 2 ) ||`<br>`        ( n > lastScanPosPass1 && coded_sub_block_flag[ xS ][ yS ] ) )` | |
| `        abs_remainder[ n ]` | ae(v) |
| `    if( n <= lastScanPosPass2 )` | |
| `        AbsLevel[ xC ][ yC ] = AbsLevelPass2[ xC ][ yC ] + 2 * abs_remainder[ n ]` | |
| `    else if( n <= lastScanPosPass1 )` | |
| `        AbsLevel[ xC ][ yC ] = AbsLevelPass1[ xC ][ yC ] + 2 * abs_remainder[ n ]` | |
| `    else { /* bypass */` | |
| `        AbsLevel[ xC ][ yC ] = abs_remainder[ n ]` | |
| `        if( abs_remainder[ n ] )` | |
| `            coeff_sign_flag[ n ]` | ae(v) |
| `    }` | |
| `    if( BdpcmFlag[ x0 ][ y0 ][ cIdx ] == 0 && n <= lastScanPosPass1 ) {` | |
| `        absLeftCoeff = xC > 0 ? AbsLevel[ xC - 1 ][ yC ] ) : 0` | |
| `        absAboveCoeff = yC > 0 ? AbsLevel[ xC ][ yC - 1 ] ) : 0` | |
| `        predCoeff = Max( absLeftCoeff, absAboveCoeff )` | |
| `        if( AbsLevel[ xC ][ yC ] == 1 && predCoeff > 0 )` | |
| `            AbsLevel[ xC ][ yC ] = predCoeff` | |
| `        else if( AbsLevel[ xC ][ yC ] > 0 && AbsLevel[ xC ][ yC ] <= predCoeff )` | |
| `            AbsLevel[ xC ][ yC ]--` | |
| `    }` | |
| `}` | |
| `    TransCoeffLevel[x0][y0][cIdx][xC][yC] = (1-2*coeff_sign_flag[n]) * AbsLevel[xC][yC]` | |
| `}` | |
| `}` | |

FIG. 12B

| slice_header( ) | Descriptor |
|---|---|
| picture_header_in_slice_header_flag | u(1) |
| if( picture_header_in_slice_header_flag ) | |
|   picture_header_structure( ) | |
| ... | ... |
| if( sps_transform_skip_enabled_flag ) | |
|   slice_ts_residual_coding_disabled_flag | u(1) |
| ... | ... |
| } | |

FIG. 13

| residual_coding( x0, y0, log2TbWidth, log2TbHeight, cIdx ) { | Descriptor |
|---|---|
| ... | |
| QState = 0 | |
| for( i = lastSubBlock; i >= 0; i-- ) { | |
|   startQStateSb = QState | |
|   xS = DiagScanOrder[ log2TbWidth - log2SbW ][ log2TbHeight - log2SbH ][ i ][ 0 ] | |
|   yS = DiagScanOrder[ log2TbWidth - log2SbW ][ log2TbHeight - log2SbH ][ i ][ 1 ] | |
|   ... | |
|   if( i < lastSubBlock && i > 0 ) { | |
|     coded_sub_block_flag[ xS ][ yS ] | ae(v) |
|     ... | |
|   } | |
|   ... | |
|   firstSigScanPosSb = numSbCoeff | |
|   lastSigScanPosSb = -1 | |
|   ... | |
|   for( n = firstPosMode0; n >= 0 && remBinsPass1 >= 4; n-- ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) && <br>     ( xC != LastSignificantCoeffX \|\| yC != Last SignificantCoeffY ) ) { | |
|       sig_coeff_flag[ xC ][ yC ] | ae(v) |
|       ... | |
|     } | |
|     if( sig_coeff_flag[ xC ][ yC ] ) { | |
|       abs_level_gtx_flag[ n ][ 0 ] | ae(v) |
|       ... | |
|       if( abs_level_gtx_flag[ n ][ 0 ] ) { | |
|         par_level_flag[ n ] | ae(v) |
|         ... | |
|         abs_level_gtx_flag[ n ][ 1 ] | ae(v) |
|         ... | ... |
|       } | |
|     if( lastSigScanPosSb == -1 ) | |
|       lastSigScanPosSb = n | |
|     firstSigScanPosSb = n | |
|   } | |

FIG. 14A

| | |
|---|---|
| AbsLevelPass1[ xC ][ yC ] = sig_coeff_flag[ xC ][ yC ] + par_level_flag[ n ] +<br>    abs_level_gtx_flag[ n ][ 0 ] + 2 * abs_level_gtx_flag[ n ][ 1 ] | |
|   if( ph_dep_quant_enabled_flag && !slice_ts_residual_coding_disabled_flag ) | ←SYN1401 |
|     QState = QStateTransTable[ QState ][ AbsLevelPass1[ xC ][ yC ] & 1 ] | |
|   firstPosMode1 = n - 1 | |
| } | |
| for( n = firstPosMode0; n > firstPosMode1; n-- ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( abs_level_gtx_flag[ n ][ 1 ] ) | |
|     abs_remainder[ n ] | ae(v) |
|   AbsLevel[ xC ][ yC ] = AbsLevelPass1[ xC ][ yC ] +2 * abs_remainder[ n ] | |
| } | |
| for( n = firstPosMode1; n >= 0; n-- ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( coded_sub_block_flag[ xS ][ yS ] ) | |
|     dec_abs_level[ n ] | ae(v) |
|   if( AbsLevel[ xC ][ yC ] > 0 ) { | |
|     if( lastSigScanPosSb = = -1 ) | |
|       lastSigScanPosSb = n | |
|     firstSigScanPosSb = n | |
|   } | |
|   if( ph_dep_quant_enabled_flag && !slice_ts_residual_coding_disabled_flag ) | ←SYN1402 |
|     QState = QStateTransTable[ QState ][ AbsLevel[ xC ][ yC ] & 1 ] | |
| } | |
| if( ph_dep_quant_enabled_flag \|\| !pic_sign_data_hiding_enabled_flag<br>\|\| slice_ts_residual_coding_disabled_flag ) | ←SYN1403 |
|   signHidden = 0 | |
| else | |
|   signHidden = ( lastSigScanPosSb - firstSigScanPosSb > 3 ? 1 : 0 ) | |
| for( n = numSbCoeff - 1; n >= 0; n-- ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( (AbsLevel[ xC ][ yC ] > 0 ) && (!signHidden \|\| (n != firstSigScanPosSb) ) ) | |
|     coeff_sign_flag[ n ] | ae(v) |
| } | |

FIG. 14B

| | |
|---|---|
| if( ph_dep_quant_enabled_flag && !slice_ts_residual_coding_disabled_flag ) { | ← SYN1404 |
| QState = startQStateSb | |
| for( n = numSbCoeff − 1; n >= 0; n− − ) { | |
| xC = ( xS  <<  log2SbW ) + DiagScanOrder[ log2SbW ][ log2SbH ][ n ][ 0 ] | |
| yC = ( yS  <<  log2SbH ) + DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] = | |
| ( 2 * AbsLevel[ xC ][ yC ] − ( QState > 1 ? 1 : 0 ) ) * | |
| ( 1 − 2 * coeff_sign_flag[ n ] ) | |
| QState = QStateTransTable[ QState ][ AbsLevel[ xC ][ yC ] & 1 ] | |
| } else { | |
| sumAbsLevel = 0 | |
| for( n = numSbCoeff − 1; n >= 0; n− − ) { | |
| xC = ( xS  <<  log2SbW ) + DiagScanOrder[ log2SbW ][ log2SbH ][ n ][ 0 ] | |
| yC = ( yS  <<  log2SbH ) + DiagScanOrder[ log2SbW ][ log2SbH ][ n ][ 1 ] | |
| if( AbsLevel[ xC ][ yC ] > 0 ) { | |
| TransCoeffLevel[ x0 ][ y0 ][ cIdx ][ xC ][ yC ]  = | |
| AbsLevel[ xC ][ yC ] * ( 1 − 2 * coeff_sign_flag[ n ] ) | |
| if( signHidden && !slice_ts_residual_coding_disabled_flag ) { | ← SYN1405 |
| sumAbsLevel  +=  AbsLevel[ xC ][ yC ] | |
| if( ( n = = firstSigScanPosSb )  &&  ( sumAbsLevel % 2 )  = = 1 ) ) | |
| TransCoeffLevel[ x0 ][ y0 ][ cIdx ][ xC ][ yC ]  = | |
| −TransCoeffLevel[ x0 ][ y0 ][ cIdx ][ xC ][ yC ] | |
| } | |
| } | |
| } | |
| } | |
| } | |
| } | |

FIG. 14C

| | Descriptor |
|---|---|
| transform_unit( x0, y0, tbWidth, tbHeight, treeType, subTuIndex, chType ) { | |
| ... | ... |
|   if( tu_cbf_luma[ x0 ][ y0 ] && treeType != DUAL_TREE_CHROMA ) { | |
|     if( sps_transform_skip_enabled_flag && !BdpcmFlag[ x0 ][ y0 ][ 0 ] && <br>       tbWidth <= MaxTsSize && tbHeight <= MaxTsSize && <br>       ( IntraSubPartitionsSplitType  = =  ISP_NO_SPLIT ) && !cu_sbt_flag ) | |
|       transform_skip_flag[ x0 ][ y0 ][ 0 ] | ae(v) |
|     if( !transform_skip_flag[ x0 ][ y0 ][ 0 ]  \|\| <br> slice_ts_residual_coding_disabled_flag ) | |
|       residual_coding( x0, y0, Log2( tbWidth ), Log2( tbHeight ), 0, <br> transform_skip_flag[ x0 ][ y0 ][ 0 ] ) | ←SYN1501 |
|     else | |
|       residual_ts_coding( x0, y0, Log2( tbWidth ), Log2( tbHeight ), 0 ) | |
|   } | |
|   if( tu_cbf_cb[ xC ][ yC ] && treeType != DUAL_TREE_LUMA ) { | |
|     if( sps_transform_skip_enabled_flag && !BdpcmFlag[ x0 ][ y0 ][ 1 ] && <br>       wC <= MaxTsSize && hC <= MaxTsSize && !cu_sbt_flag ) | |
|       transform_skip_flag[ xC ][ yC ][ 1 ] | ae(v) |
|     if( !transform_skip_flag[ xC ][ yC ][ 1 ]  \|\| <br> slice_ts_residual_coding_disabled_flag ) | |
|       residual_coding( xC, yC, Log2( wC ), Log2( hC ), 1, <br> transform_skip_flag[ x0 ][ y0 ][ 1 ] ) | ←SYN1502 |
|     else | |
|       residual_ts_coding( xC, yC, Log2( wC ), Log2( hC ), 1 ) | |
|   } | |
|   if( tu_cbf_cr[ xC ][ yC ] && treeType != DUAL_TREE_LUMA && <br>     !( tu_cbf_cb[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && <br>       wC <= MaxTsSize && hC <= MaxTsSize && !cu_sbt_flag ) | |
|       transform_skip_flag[ xC ][ yC ][ 2 ] | ae(v) |
|     if( !transform_skip_flag[ xC ][ yC ][ 2 ]  \|\| <br> slice_ts_residual_coding_disabled_flag ) | |
|       residual_coding( xC, yC, Log2( wC ), Log2( hC ), 2, <br> transform_skip_flag[ x0 ][ y0 ][ 2 ] ) | ←SYN1503 |
|     else | |
|       residual_ts_coding( xC, yC, Log2( wC ), Log2( hC ), 2 ) | |
|   } | |
| } | |

FIG. 15

| residual_coding( x0, y0, log2TbWidth, log2TbHeight, cIdx, transform_skip_flag ) { | Descriptor |
|---|---|
| ... | |
| QState = 0 | |
| for( i = lastSubBlock; i >= 0; i- - ) { | |
|   startQStateSb = QState | |
|   xS = DiagScanOrder[ log2TbWidth - log2SbW ][ log2TbHeight - log2SbH ][ i ][ 0 ] | |
|   yS = DiagScanOrder[ log2TbWidth - log2SbW ][ log2TbHeight - log2SbH ][ i ][ 1 ] | |
|   ... | |
|   if( i < lastSubBlock && i > 0 ) { | |
|     coded_sub_block_flag[ xS ][ yS ] | ae(v) |
|     ... | |
|   } | |
|   ... | |
|   firstSigScanPosSb = numSbCoeff | |
|   lastSigScanPosSb = -1 | |
|   ... | |
|   for( n = firstPosMode0; n >= 0 && remBinsPass1 >= 4; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) && <br>      ( xC != LastSignificantCoeffX \|\| yC != Last SignificantCoeffY ) ) { | |
|       sig_coeff_flag[ xC ][ yC ] | ae(v) |
|       ... | |
|     } | |
|     if( sig_coeff_flag[ xC ][ yC ] ) { | |
|       abs_level_gtx_flag[ n ][ 0 ] | ae(v) |
|       ... | |
|       if( abs_level_gtx_flag[ n ][ 0 ] ) { | |
|         par_level_flag[ n ] | ae(v) |
|         ... | |
|       abs_level_gtx_flag[ n ][ 1 ] | ae(v) |
|       ... | ... |
|     } | |
|     if( lastSigScanPosSb = = -1 ) | |
|       lastSigScanPosSb = n | |
|     firstSigScanPosSb = n | |
|   } | |

FIG. 16A

| | |
|---|---|
| AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_flag[ n ][ 1 ] | |
|   if( ph_dep_quant_enabled_flag && !transform_skip_flag ) | ←SYN1601 |
|     QState = QStateTransTable[ QState ][ AbsLevelPass1[ xC ][ yC ] & 1 ] | |
|   firstPosMode1 = n − 1 | |
| } | |
| for( n = firstPosMode0; n > firstPosMode1; n− − ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( abs_level_gtx_flag[ n ][ 1 ] ) | |
|     abs_remainder[ n ] | ae(v) |
|   AbsLevel[ xC ][ yC ] = AbsLevelPass1[ xC ][ yC ] +2 * abs_remainder[ n ] | |
| } | |
| for( n = firstPosMode1; n >= 0; n− − ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( coded_sub_block_flag[ xS ][ yS ] ) | |
|     dec_abs_level[ n ] | ae(v) |
|   if( AbsLevel[ xC ][ yC ] > 0 ) { | |
|     if( lastSigScanPosSb = = −1 ) | |
|       lastSigScanPosSb = n | |
|     firstSigScanPosSb = n | |
|   } | |
|   if( ph_dep_quant_enabled_flag && !transform_skip_flag ) | ←SYN1602 |
|     QState = QStateTransTable[ QState ][ AbsLevel[ xC ][ yC ] & 1 ] | |
| } | |
| if( ph_dep_quant_enabled_flag \|\| !pic_sign_data_hiding_enabled_flag \|\| transform_skip_flag ) | ←SYN1603 |
|   signHidden = 0 | |
| else | |
|   signHidden = ( lastSigScanPosSb − firstSigScanPosSb > 3 ? 1 : 0 ) | |
| for( n = numSbCoeff − 1; n >= 0; n− − ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( (AbsLevel[ xC ][ yC ] > 0 ) && (!signHidden \|\| ( n != firstSigScanPosSb) ) ) | |
|     coeff_sign_flag[ n ] | ae(v) |
| } | |

FIG. 16B

```
if( ph_dep_quant_enabled_flag && !transform_skip_flag ) {                              ← SYN1604
  QState = startQStateSb
  for( n = numSbCoeff - 1; n >= 0; n-- ) {
    xC = ( xS  <<  log2SbW ) + DiagScanOrder[ log2SbW ][ log2SbH ][ n ][ 0 ]
    yC = ( yS  <<  log2SbH ) + DiagScanOrder[ log2SbW ][ log2SbH ][ n ][ 1 ]
    if( AbsLevel[ xC ][ yC ]  >  0 )
      TransCoeffLevel[ x0 ][ y0 ][ cIdx ][ xC ][ yC ] =
        ( 2 * AbsLevel[ xC ][ yC ] - ( QState > 1 ? 1 : 0 ) ) *
        ( 1 - 2 * coeff_sign_flag[ n ] )
    QState = QStateTransTable[ QState ][ AbsLevel[ xC ][ yC ] & 1 ]
} else {
  sumAbsLevel = 0
  for( n = numSbCoeff - 1; n >= 0; n-- ) {
    xC = ( xS  <<  log2SbW ) + DiagScanOrder[ log2SbW ][ log2SbH ][ n ][ 0 ]
    yC = ( yS  <<  log2SbH ) + DiagScanOrder[ log2SbW ][ log2SbH ][ n ][ 1 ]
    if( AbsLevel[ xC ][ yC ]  >  0 ) {
      TransCoeffLevel[ x0 ][ y0 ][ cIdx ][ xC ][ yC ]  =
        AbsLevel[ xC ][ yC ] * ( 1 - 2 * coeff_sign_flag[ n ] )
      if( signHidden && !transform_skip_flag ) {                                        ← SYN1605
        sumAbsLevel  +=  AbsLevel[ xC ][ yC ]
        if( ( n  = =  firstSigScanPosSb )  &&  ( sumAbsLevel % 2 )  = =  1 ) )
          TransCoeffLevel[ x0 ][ y0 ][ cIdx ][ xC ][ yC ] =
            -TransCoeffLevel[ x0 ][ y0 ][ cIdx ][ xC ][ yC ]
      }
    }
  }
 }
}
```

FIG. 16C

IMAGE DECODING APPARATUS AND IMAGE CODING APPARATUS

CROSS-REFERENCE TO RELATED APPLICATIONS

This application is a continuation of U.S. patent application Ser. No. 18/136,818, filed on Apr. 19, 2023, which is a continuation of U.S. patent application Ser. No. 17/710,172, filed on Mar. 31, 2022, which is a continuation of U.S. patent application Ser. No. 17/179,016, filed on Feb. 18, 2021, which claims the benefit of priority to Japanese Patent Application Number 2020-028529 filed on Feb. 21, 2020. The entire contents of the above-identified application are hereby incorporated by reference.

BACKGROUND

Technical Field

The embodiments of the present disclosure relate to an image decoding apparatus and an image coding apparatus.

For efficient transmission and recording of images, an image coding apparatus coding an image to generate coded data and an image decoding apparatus decoding the coded data to generate a decoded image are used.

A specific image coding scheme may be, for example, H.264/AVC and High-Efficiency Video Coding (HEVC), and the like.

In such an image coding scheme, images (pictures) constituting a video are managed by using a hierarchical structure including slices obtained by splitting an image, Coding Tree Units (CTUs) obtained by splitting each of the slices, units of coding (which may also be referred to as Coding Units (CUs)) obtained by splitting each of the coding tree unit, and Transform Units (TUs) obtained by splitting each of the coding units, and are coded/decoded on a CU-by-CU basis.

In such an image coding scheme, usually, a prediction image is generated based on a local decoded image that is obtained by coding/decoding an input image (a source image), and a prediction error (which may be referred to also as "difference images" or "residual images") obtained by subtracting the prediction image from the input image is coded. Generation methods of prediction images include an inter-picture prediction (an inter-prediction) and an intra-picture prediction (intra prediction).

In addition, "Versatile Video Coding (Draft 8)", JVET-Q2001, Joint Video Exploration Team (JVET) of ITU-T SG 16 WP 3 and ISO/IEC JTC 1/SC 29/WG 11, 7-17 Jan. 2020 may be cited as a recent image coding and decoding technique. "Versatile Video Coding (Draft 8)", JVET-Q2001, Joint Video Exploration Team (JVET) of ITU-T SG 16 WP 3 and ISO/IEC JTC 1/SC 29/WG 11, 7-17 Jan. 2020 discloses a "Sign Data Hiding (SDH)", which is a technique for estimating transform coefficients calculated by inversely quantizing a quantization transform coefficient related to a prediction error without coding a positive or negative sign for some of the transform coefficients, in order to increase coding efficiency. "Dependent Quantization (DQ)" has been disclosed in which quantization and inverse quantization are performed by switching between two quantizers with different levels.

On the other hand, in applications for medical care, works of art, and the like which use videos may require decoded images subjected to no or substantially no degradation. In order to achieve such lossless or near-lossless coding, techniques have been disclosed that do not use transform (inverse transform) or quantization (inverse quantization) for coding (decoding). One of these techniques is referred to as "Transform Skip (TS)". Transform skip is also considered to be one of the transforms (Identical Transform), and whether the transform corresponds to transform skip is coded as the type of transform.

In addition, "Transform Skip Residual Coding (TSRC)" is known in which the transform skip involves coding different from Regular Residual Coding (RRC).

SUMMARY

For a combination of transform skip, sign_data_hiding, dependent quantization, transform skip residual quantization (TSRC), and regular residual_coding (RRC), the technique in "Versatile Video Coding (Draft 8)", JVET-Q2001, Joint Video Exploration Team (JVET) of ITU-T SG 16 WP 3 and ISO/IEC JTC 1/SC 29/WG 11, 7-17 Jan. 2020 does not perform sign_data_hiding or dependent quantization in transform skip residual quantization (TSRC). Accordingly, transform skip, sign_data_hiding, and dependent quantization are excluded. However, regular residual coding (RRC) includes a combination of transform skip, sign data hiding, and dependent quantization, and thus there is a problem in that the image decoding apparatus and the image coding apparatus are still complex. In particular, implementation of hardware and software that achieves a less effective combination is disadvantageously inadequate to compensate for increased costs.

In order to solve the problems described above, an image decoding apparatus according to an aspect of the present disclosure includes: a header decoder configured to decode, from coded data, a flag ph_dep_quant_enabled_flag indicating whether dependent quantization is enabled and a flag slice_ts_residual_coding_disabled_flag prohibiting transform skip residual quantization; and a TU decoder configured to decode a transform coefficient in a TU block in an RRC mode in which a LAST position is coded, the LAST position corresponding to a decoding start position for the transform coefficient, or a TSRC mode in which the LAST position is not coded, wherein the TU decoder performs dependent quantization in the RRC mode in a case that the transform coefficient for transform skip is decoded in the TSRC mode (slice_ts_residual_coding_disabled_flag=0), and does not perform dependent quantization in the RRC mode in a case that the transform coefficient for transform skip is decoded in the RRC mode (slice_ts_residual_coding_ disabled_flag=1).

An image decoding apparatus includes: a header decoder configured to decode, from coded data, a flag ph_dep_quant_enabled_flag indicating whether dependent quantization is enabled and a flag slice_ts_residual_coding_disabled_flag prohibiting transform skip residual quantization; and a TU decoder configured to decode a transform coefficient, wherein the TU decoder performs dependent quantization and decodes the transform coefficient in a case that ph_dep_quant_enabled_flag is 1 and that slice_ts_residual_coding_disabled_flag is 0, and otherwise decodes the transform coefficient without performing dependent quantization in a case that ph_dep_quant_enabled_flag is 0 or that slice_ts_residual_coding_disabled_flag is 1.

An image decoding apparatus includes: a header decoder configured to decode, from coded data, a flag ph_dep_quant_enabled_flag indicating whether dependent quantization is enabled and a flag pic_sign_data_hiding_enabled_flag indicating whether sign_data hiding is enabled, and a flag slice_ts_residual_coding_disabled_flag prohibiting transform skip residual quantization; and a TU decoder configured to decode a transform coefficient, wherein the TU decoder does not perform sign_data_hiding in a case that ph_dep_quant_enabled_flag is 1 or that pic_sign_data_hiding_enabled_flag is 0 or that slice_ts_residual_coding_disabled_flag is 1.

Such a configuration allows removal of the combination of transform skip, sign_data_hiding, and dependent quantization, and is thus effective for reducing hardware and software implementation costs.

According to the configuration described above, any of the above-described problems can be solved.

BRIEF DESCRIPTION OF DRAWINGS

The disclosure will be described with reference to the accompanying drawings, wherein like numbers reference like elements.

FIGS. 9A and 9B are diagrams illustrating syntax elements related to quantization transform coefficients.

FIGS. 10A and 10B are diagrams illustrating syntax elements related to quantization transform coefficients.

FIG. 11A is a syntax table related to RRC.
FIG. 11B is a syntax table related to RRC.
FIG. 11C is a syntax table related to RRC.
FIG. 12A is a syntax table related to TSRC.
FIG. 12B is a syntax table related to TSRC.
FIG. 13 is a syntax table related to a slice header according to the present embodiment.
FIG. 14A is a syntax table related to RRC according to the present embodiment.
FIG. 14B is a syntax table related to RRC according to the present embodiment.
FIG. 14C is a syntax table related to RRC according to the present embodiment.
FIG. 15 is a syntax table related to TU according to the present embodiment.
FIG. 16A is a syntax table related to RRC according to the present embodiment.
FIG. 16B is a syntax table related to RRC according to the present embodiment.
FIG. 16C is a syntax table related to RRC according to the present embodiment.

DESCRIPTION OF EMBODIMENTS

First Embodiment

Hereinafter, embodiments of the present disclosure will be described with reference to the drawings.

Figure 1:
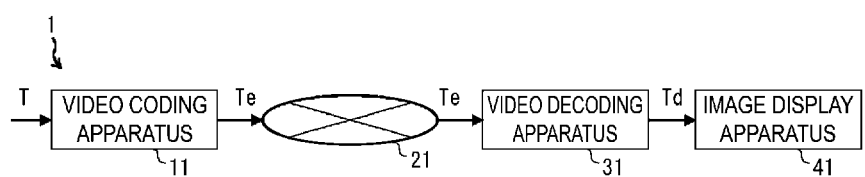
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system transmitting a coding stream obtained by coding a coding target image, decoding the coding stream transmitted, and displaying an image. The image transmission system 1 includes a video coding apparatus (image coding apparatus) 11, a network 21, a video decoding apparatus (image decoding apparatus) 31, and an image display apparatus 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting, or the like. The network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted by the network 21 and generates one or multiple decoded images Td.

The image display apparatus 41 displays all or part of the one or multiple decoded images Td generated by the video decoding apparatus 31. For example, the image display apparatus 41 includes a display device such as a liquid crystal display and an organic Electro-Luminescence (EL) display. Configurations of the display include a stationary display, a mobile display, an HMD, and the like. In a case that the video decoding apparatus 31 has a high processing capability, an image with high image quality is displayed, and in a case that the apparatus only has a lower processing capability, an image is displayed which does not require a high processing capability or display capability.

Operator

Operators used in the present specification will be described below.

$>>$ is a right bit shift, $<<$ is a left bit shift, $\&$ is a bitwise AND, $|$ is a bitwise OR, $|=$ is an OR assignment operator, and $\|$ denotes a logical sum.

x ? y: z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.
Int (a) is a function that returns an integer value of a.

floor (a) is a function that returns a minimum integer less than or equal to a.

ceil (a) is a function that returns a maximum integer greater than or equal to a.

a/d represents division of a by d (discarding digits to the right of decimal point).

Structure of Coding Stream Te

Prior to detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
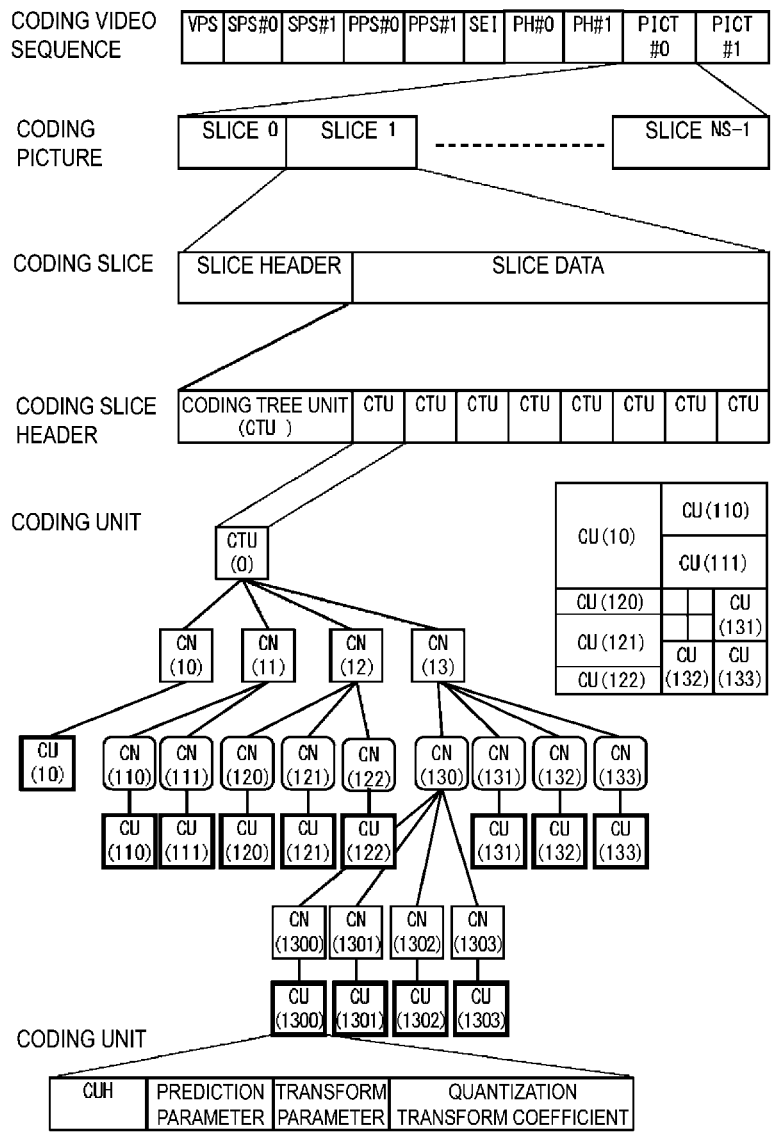
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 is a diagram illustrating a coding video sequence defining a sequence SEQ, a coded picture prescribing a picture PICT, a coding slice prescribing a slice S, a coding slice data prescribing slice data, a coding tree unit included in the coding slice data, and a coding unit included in each coding tree unit, respectively.

Coding Video Sequence

In the coding video sequence, a set of data referred to by the video decoding apparatus 31 to decode the sequence SEQ to be processed is defined. As illustrated in the coding video sequence in FIG. 4, the sequence SEQ includes a Video Parameter Set, a Sequence Parameter Set SPS, a Picture Parameter Set PPS, a picture header, a picture PICT, and Supplemental Enhancement Information SEI.

In the video parameter set VPS, in an image including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, the picture parameter set PPS includes a reference value (pic_init_qp_minus26) of a quantization step size used for decoding of a picture, a flag (weighted_pred_flag) indicating an application of a weighted prediction, and a scaling list (quantization matrix). Note that multiple PPSs may exist. In that case, any of multiple PPSs is selected from each picture in a target sequence.

In the picture header, coding parameters common to all slices included in one coded picture are defined. For example, the picture header includes coding parameters for a Picture Order Count (POC) or splitting.

Coded Picture

In the coded picture, a set of data referred to by the video decoding apparatus 31 to decode the picture PICT to be processed is defined. As illustrated in the coded picture in FIG. 4, the picture PICT includes slices 0 to NS-1 (NS is the total number of slices included in the picture PICT).

Note that in a case that it is not necessary to distinguish each of the slices 0 to NS-1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. The slice includes a slice header and slice data, as shown in the coding slice of FIG. 4.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a unidirectional prediction or a bidirectional prediction, and a greater number of reference pictures may be used to generate the prediction image. Hereinafter, in a case that a P slice or a B slice is referred to, the P slice or the B slice refers to a slice including a block for which an inter prediction can be used.

Note that, the slice header may include a reference to the picture parameter set PPS (pic parameter set id).

Coding Slice Data

In the coding slice data, a set of data referred to by the video decoding apparatus 31 to decode the slice data to be processed is defined. The slice data includes a CTU, as illustrated in the coding slice header of FIG. 4. A CTU is a block of a fixed size (for example, 64×64) constituting a slice, and may be called a Largest Coding Unit (LCU).

Coding Tree Unit

In the coding tree unit in FIG. 4, a set of data referred to by the video decoding apparatus 31 to decode the CTU to be processed is defined. The CTU is divided into coding units CU, which are basic units of coding processing by recursive Quad Tree (QT) splitting, Binary Tree (BT) splitting, or a Ternary Tree (TT) splitting. The BT splitting and the TT splitting are collectively referred to as a Multi Tree (MT) splitting. Nodes of a tree structure obtained by recursive quad tree splitting are referred to as Coding Nodes. Intermediate nodes of a quad tree, a binary tree, and a tertiary tree are coding nodes, and the CTU itself is also defined as a highest coding node.

Figure 5:
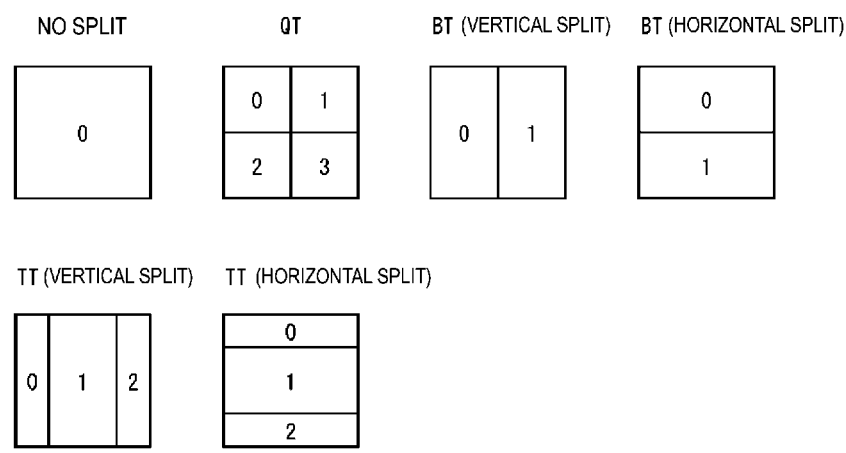
FIG. 5 is a diagram illustrating an example of splitting of a CTU.

The CT includes a split flag indicating whether to perform a QT splitting as CT information. An example of a splitting is illustrated in FIG. 5.

The CU is a terminal node of the coding nodes and is not split any further. The CU is a basic unit of coding processing.

Coding Unit

As illustrated in the coding unit in FIG. 4, a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

The prediction processing may be performed in CUs or in sub-CUs, into which the CU is further split. In a case that the CU is equal in size to the sub-CU, one sub-CU is included in the CU. In a case that the CU is larger in size than the sub-CU, the CU is divided into sub-CUs. For example, in a case that the CU is 8×8 and the sub-CU is 4×4, the CU is split into four sub-CUs including two sub-CUs in the horizontal direction and two sub-CUs in the vertical direction.

The types of prediction (prediction mode CuPredMode) include at least two types: an intra prediction (MODE_INTRA) and an inter prediction (MODE_INTER). Furthermore, intrablock copy prediction (MODE_IBC) may be included. The intra prediction and the intrablock copy prediction refer to predictions in an identical picture, and the inter prediction refers to prediction processing performed between different pictures (for example, between pictures of different display times, and between pictures of different layer images).

Transform and quantization processing is performed in CUs, but the quantization transform coefficient may be entropy coded in sub-block units such as 4×4.

The prediction image is derived by a prediction parameter associated with the block. The prediction parameter includes a prediction parameter for intra prediction or a prediction parameter for inter prediction.

Configuration of Video Decoding Apparatus

Figure 6:
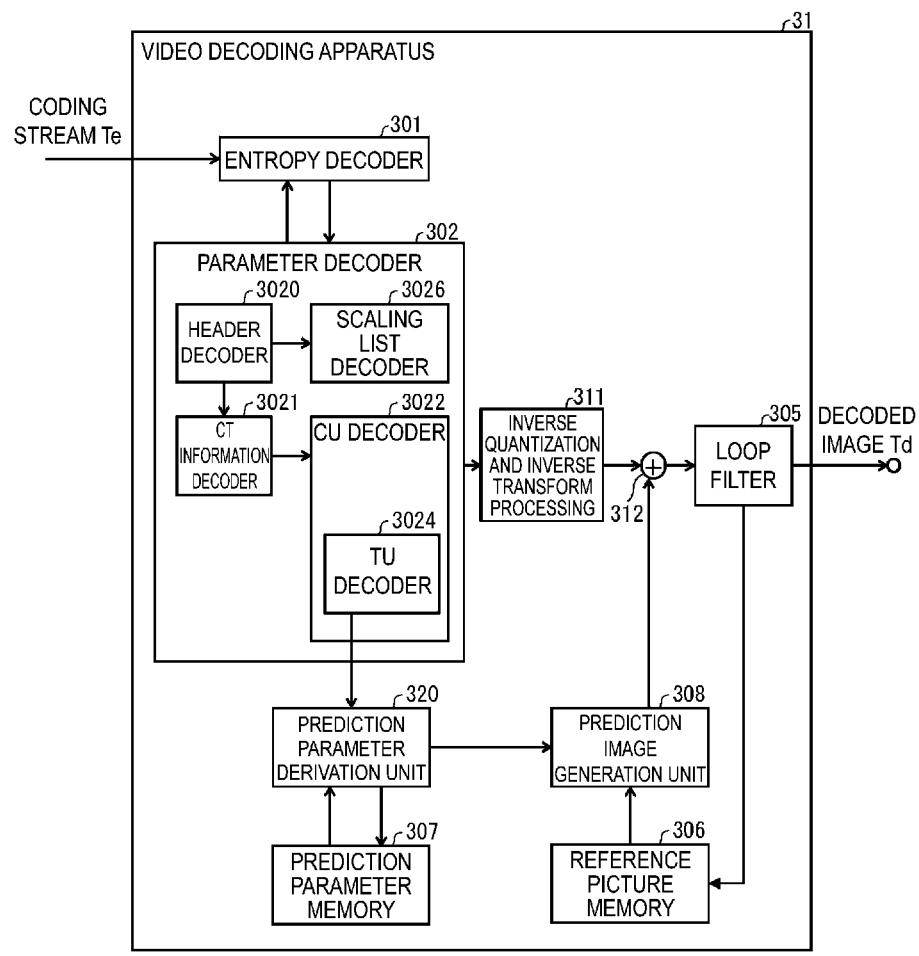
FIG. 6 is a schematic diagram illustrating a configuration of the video decoding apparatus.

Now, a configuration of the video decoding apparatus 31 (FIG. 6) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that, in a certain configuration, the loop filter 305 is not included in the video decoding apparatus 31 in accordance with the video coding apparatus 11 described below.

The parameter decoder 302 further includes a header decoder 3020, a CT information decoder 3021, and a CU decoder 3022 (prediction mode decoder). The CU decoder 3022 includes a TU decoder 3024. These units may be collectively referred to as decoding modules. The header decoder 3020 decodes the parameter set information such as VPS, SPS, or PPS, and a slice header (slice information) from the coded data. The CT information decoder 3021 decodes the CT from the coded data. The CU decoder 3022 decodes the CU from the coded data. The TU decoder 3024 decodes the QP update information (quantization correction value) and the quantization transform coefficient (residual_coding) from the coded data.

In a case where a prediction error is included in the TU, the TU decoder 3024 decodes the QP update information and the quantization transform coefficient from the coded data. Derivation of the quantization transform coefficient may involve multiple modes (e.g., RRC mode and TSRC mode). Specifically, different types of processing may be executed for derivation of a regular prediction error using transform (Regular Residual Coding (RRC)) and for derivation of a prediction error in a transform skip mode using no transform (Transform Skip Residual Coding (TSRC)). Note that the QP update information indicates a difference value from a quantization parameter prediction value qPpred corresponding to a prediction value of a quantization parameter QP.

An example in which CTUs and CUs are used as units of processing will be described below, but the present disclosure is not limited to this example, and processing may be performed in sub-CUs. Alternatively, the CTU and CU may be replaced with a block, and the sub-CU may be replaced with a sub-block, and the processing may be executed in block or sub-block units.

The entropy decoder 301 performs entropy decoding on the coding stream Te input from the outside and parses individual codes (syntax elements). Entropy coding includes a scheme in which syntax elements are variable-length coded using contexts (probability models) adaptively selected depending on the type of syntax element or the surrounding situation, and a scheme in which syntax elements are variable-length coded using a predetermined table or calculation formula. Examples of the former include Context Adaptive Binary Arithmetic Coding (CABAC). The parsed codes include prediction information used to generate a prediction image, a prediction error used to generate a difference image, and the like.

The entropy decoder 301 outputs the separated codes to the parameter decoder 302. The separated code is, for example, a prediction mode CuPredMode. Which code is to be decoded is controlled based on an indication from the parameter decoder 302.

Basic Flow

Figure 7:
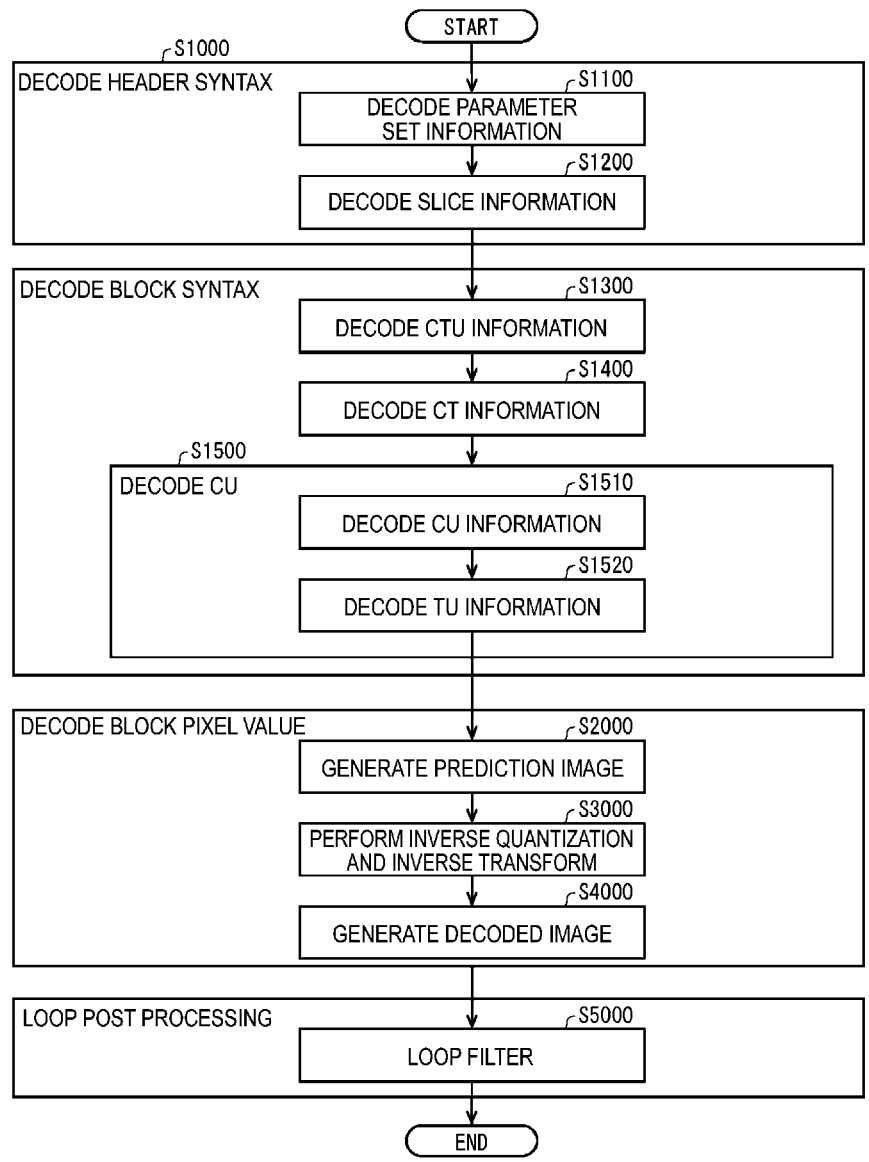
FIG. 7 is a flowchart illustrating a general operation of a video decoding apparatus.

FIG. 7 is a flow chart illustrating a general operation of the video decoding apparatus 31.

(S1100: Decode parameter set information) The header decoder 3020 decodes parameter set information such as VPS, SPS, PPS, SEI, and PH from coded data.

(S1200: Decode slice information) The header decoder 3020 decodes a slice header (slice information) from the coded data.

Hereinafter, the video decoding apparatus 31 derives a decoded image of each CTU by repeating the processing from S1300 to S5000 for each CTU included in a target picture.

(S1300: Decode CTU information) The CT information decoder 3021 decodes the CTU from the coded data.

(S1400: Decode CT information) The CT information decoder 3021 decodes CTs from the coded data.

(S1500: Decode CU) The CU decoder 3022 performs S1510 and S1520 to decode CUs from the coded data. The CU decoder 3022 decodes a difference CuQpDeltaVal between quantization parameters from the coded data in CUs, and derives quantization parameters.

(S1510: Decode CU information) The CU decoder 3022 decodes CU information, prediction information, a TU split flag split_transform_flag, CU residue flags cbf_cb, cbf_cr, cbf_luma, and the like from the coded data.

(S1520: Decode TU information) The TU decoder 3024 decodes QP update information and a quantization transform coefficient from the coded data in a case that the TU includes a prediction error.

(S2000: Generate prediction image) The prediction image generation unit 308 generates a prediction image, based on the prediction information for each block included in a target CU.

(S3000: Inverse quantization and inverse transform) The inverse quantization and inverse transform processing unit 311 performs inverse quantization and inverse transform processing on each of the TUs included in the target CU.

(S4000: Generate decoded image) The addition unit 312 adds the prediction image supplied by the prediction image generation unit 308 and the prediction error supplied by the inverse quantization and inverse transform processing unit 311, to generate the decoded image of the target CU.

(S5000: Loop filter) The loop filter 305 applies, to the decoded image, a loop filter such as a deblocking filter, a Sample Adaptive Filter (SAO), or an Adaptive Loop Filter (ALF), to generate a decoded image.

Derivation of Quantization Transform Coefficient and Residue Coding

In a case that lossless coding or pixel-to-pixel correlation in the original picture is insignificant, the coding efficiency may be increased by refraining from transform. A technique for refraining from transform is referred to as Transform Skip.

Transform skip is also referred to as Identical Transform, and performs only scaling of the transform coefficient in accordance with the quantization parameter. The use of transform skip is signalled using a syntax element transform_skip_flag. transform_skip_flag may be signalled for each of the color components (cIdx) of Y, Cb, and Cr.

Derivation of a regular prediction error using transform (Regular Residual Coding (RRC)) differs from derivation of a prediction error in the transform skip mode (Transform Skip Residual Coding (TSRC)) in the method for coding a prediction error and in the method for decoding a prediction error.

Figure 8:
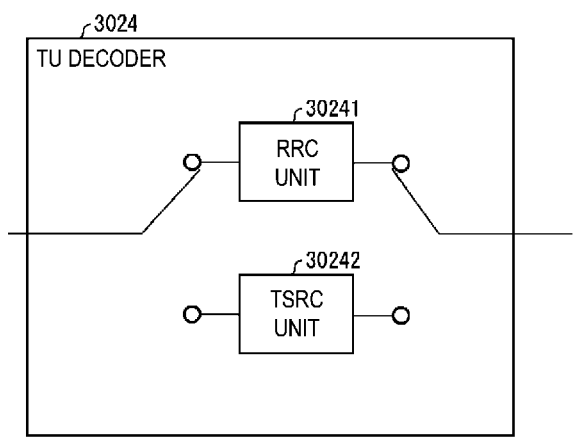
FIG. 8 is a schematic diagram illustrating a configuration of a TU decoder.

FIG. 8 is a block diagram of the TU decoder 3024, including an RRC unit 30241 and a TSRC unit 30242. The RRC unit 30241 is a processing unit deriving a regular prediction error using transform, and the TSRC unit 30242 is a processing unit deriving a prediction error in the transform skip mode.

sps_transform_skip_enabled_flag in FIG. 9A is a flag indicating whether transform_skip_flag is signalled in each TU. sps_transform_skip_enabled_flag=1 indicates that transform_skip_flag is signalled in each TU. sps_transform_skip_enabled_flag=0 indicates that transform_skip_flag is not signalled in each TU. In a case that sps_transform_skip_enabled_flag is not signalled, the flag is inferred to be 0.

min_qp_prime_ts_minus4 in FIG. 9A is a parameter for deriving the minimum quantization parameter QpPrimeTsMin in the transform skip mode. QpPrimeTsMin is derived by 4+min_qp_prime_ts_minus4.

transform_skip_flag [x0] [y0] [cIdx] in FIG. 10B indicates whether transform is applied to the block at a position (x0, y0) with respect to the upper left coordinates of a picture with the color component cIdx. In a case of transform_skip_flag=1 (transform skip mode), no transform is applied to this block. In a case of transform_skip_flag=0, whether transform is applied to the block depends on other parameters.

FIGS. 11A, 11B and 11C and FIGS. 12A and 12B illustrate syntaxes indicating a method for coding a transform coefficient (prediction error) in the RRC and TSRC.
RRC Unit and RRC Mode In a regular residual_coding method (FIGS. 11A, 11B and 11C) that performs no transform skip, the RRC unit 30241 decodes the syntax element (not illustrated) indicating the LAST position, and derives the LAST position (LastSignificantCoeffX, LastSignificantCoeffY). The LAST position is the position of a last non-zero coefficient in a case that TU transform coefficients are scanned in a direction from lower frequency components to higher frequency components. In a case that the transform coefficients are sequentially decoded from higher frequency components, the LAST position indicates the position of the quantization transform coefficient to be initially decoded. Then, the RRC unit 30241 decodes coded_sub_block_flag with reference to the LAST position. coded_sub_block_flag is a flag indicating whether a non-zero coefficient is included in the sub-block. The sub-block is a region obtained by splitting the TU into 4×4 units. In a case that coded_sub_block_flag=1 (the sub-block includes a non-zero coefficient), the RRC unit 30241 decodes sig_coeff_flag. sig_coeff_flag is a flag indicating whether the coefficient value is non-zero. In a case that sig_coeff_flag=1 (the coefficient value is non-zero), the RRC unit 30241 decodes abs_level_gtx_flag, par_level_flag, abs_remainder, and dec_abs_level. These are syntax elements that indicate the absolute values of the coefficients. The RRC unit 30241 derives the absolute values of the coefficients from these syntax elements. The RRC unit 30241 references signHidden (described below) and the absolute value and position of each coefficient to determine whether coeff_sign_flag has been signalled, and in a case that coeff_sign_flag has been signalled, decodes coeff_sign_flag. coeff_sign_flag [n] is a flag indicating the sign of the quantization transform coefficient value at a scan position n. The RRC unit 30241 derives the coefficient value from the absolute value of the coefficient and coeff_sign_flag.

As described above, the RRC unit 30241 is characterized by decoding the LAST position in the sub-block of the TU.

In a residual_coding method (FIGS. 12A and 12B) in a case that no transform is performed (the transform skip mode), the TSRC unit 30242 decodes coded_sub_block_flag of each sub-block. In a case that coded_sub_block_flag=1 (a non-zero coefficient is included in the sub-block), the TSRC unit 30242 decodes sig_coeff_flag [xC] [yC] for the transform coefficient at the position (xC, xC) in the sub-block. In a case that sig_coeff_flag=1 (the coefficient value is non-zero), the TSRC unit 30242 decodes coeff_sign_flag, abs_level_gtx_flag, par_level_flag, and abs remainder. These are syntax elements that indicate the absolute values of the coefficients. The TSRC unit 30242 derives the absolute values of the coefficients from these syntax elements.

As described above, the TSRC unit 30242 is characterized by not decoding the LAST position in the sub-block of TU.
Derivation of Quantization Transform Coefficient and Sign Data Hiding The positivity and negativity of a non-zero quantization transform coefficient may reference another parameter to infer the positivity and negativity of the coefficient value, instead of deriving from the flag signalled for each coefficient (sign data_hiding). sps_sign_data_hiding_enabled_flag in FIG. 9A is a flag indicating whether estimation of sign bits of a coefficient is enabled in a picture referencing a certain SPS. sps_sign_data_hiding_enabled_flag=0 indicates that estimation of the sign bits is disabled. sps_sign_data_hiding_enabled_flag=1 indicates that estimation of the sign bits may be enabled. In a case that sps_sign_data_hiding_enabled_flag is not signalled, the flag is inferred to be 0.

pic_sign_data_hiding_enabled_flag in FIG. 9B is a flag indicating whether estimation of the sign bits of the quantization transform coefficient is enabled in the current picture. pic_sign_data_hiding_enabled_flag=0 indicates that estimation the sign bits is disabled. pic_sign_data_hiding_enabled_flag=1 indicates that estimation of the sign bits may be enabled. In a case that pic_sign_data_hiding_enabled_flag is not signalled, the flag is inferred to be 0.

coeff_sign_flag [n] in FIGS. 11A, 11B and 11C are flag indicating the sign of the quantization transform coefficient value at the scan position n. For coeff_sign_flag [n]=0, the coefficient value is positive. Otherwise (coeff_sign_flag [n]=1), the coefficient value is negative. In a case that coeff_sign_flag [n] is not signalled, the flag is inferred to be 0.

The RRC unit 30241 derives a flag signHidden indicating whether to derive the sign of a specific transform coefficient with estimation. For example, the RRC unit 30241 derives signHidden with reference to pic_sign_data_hiding_enabled_flag, ph_dep_quant_enabled_flag (described below), and the distribution of non-zero coefficients as indicated by the equation below. The distribution of non-zero coefficients may be, for example, a difference value between first- SigScanPosSb and lastSigScanPosSb. In a case that the difference value is greater than the specific value, the RRC unit 30241 may set SignHidden to 1, or otherwise set SignHidden to zero. The specific value may be, for example, 3.

```
if(ph_dep_quant_enabled_flag
| | !pic_sign_data_hiding_enabled_flag)
     signHidden = 0
   else
     signHidden = (lastSigScanPosSb - firstSigScanPosSb > 3 ?
1 : 0)
```

Here, lastSigScanPosSb is the position of the transform coefficient located last in the sub-block (the position of the first decoded transform coefficient) in the high-frequency side, and firstSigScanPosSb is the position of the transform coefficient located first in the sub-block in the low-frequency side.

As illustrated in FIGS. 11A, 11B and 11C, in a case that the coefficient value is non-zero (AbsLevel [xC] [yC]>0) and any of the following conditions is satisfied, the coeff_sign_flag is signalled, and the RRC unit 30241 decodes the coeff_sign_flag and derives the sign of the coefficient.
  signHidden is 0.
  Coefficient is not the last decoded position in the subblock (n !=firstSigScanPosSb).

Otherwise (in a case that the coefficient value is zero, or, signHidden is non-zero and the coefficient position is the last decoded position in the sub-block), coeff_sign_flag is not signalled. Then, the RRC unit 30241 determines the sign of the coefficient depending on whether sumAbsLevel is an odd number or an even number (SYN1102). sumAbsLevel is the sum of the absolute values of the transform coefficients already decoded in the sub-block. Specifically, in a case that (sumAbsLevel %2)==1 is true, the sign of the coefficient is assumed to be negative.

Derivation of Quantization Transform Coefficient, and Dependent Quantization

As a quantization method, two methods for scalar quantization and dependent quantization are provided. The inverse quantization and inverse transform processing unit 311 inversely quantizes a transform coefficient. In a case of dependent quantization, the RRC unit 30241 may further perform a portion of the inverse quantization processing.

The inverse quantization and inverse transform processing unit 311 derives linear scale values ls [x] [y] according to the values of the quantization parameter qP, rectNonTsFlag, and the quantization matrix m [ ] [ ] as follows. The inverse quantization and inverse transform processing unit 311 switches methods of deriving ls [ ] [ ] for a case where dependent quantization is enabled and where transform skip is disabled, or, the other cases.

```
if(ph_dep_quant_enabled_flag && ! transform_skip_flag)
    ls [x] [y] = (m [x] [y] * levelScale [rectNonTsFlag] [(qP +
1)%6]) << ((qP + 1)/6)
   else
    ls [x] [y] = (m [x] [y] * levelScale [rectNonTsFlag]
[qP%6]) << (qP/6)
   rectNonTsFlag = transform_skip_flag == 1 | | (((Log2(nTbW) +
Log2(nTbH)) & 1) == 1) ? 1 : 0
   bdShift = transform_skip_flag == 1 ? 10 : BitDepth +
rectNonTsFlag + ((Log2 (nTbW) + Log2(nTbH))/2) - 5 +
ph_dep_quant_enabled_flag
```

First, in a case that scalar quantization is enabled, the transform coefficient is uniquely derived from the quantization transform coefficient and quantization parameter. For example, in FIGS. 11A, 11B and 11C or in FIGS. 12A and 12B, a transform coefficient value d is derived from the following equation.

TransCoeffLevel [x0][y0][cIdx][xC][yC]=AbsLevel [xC][yC]*(1-2*coeff_sign_flag [n])

d[x0][y0][cIdx][xC][yC]=(TransCoeffLevel [x0] [y0][cIdx][xC][yC]*1s[xC][yC]+((1<<bdShift)>>1))>>bdShift Here, AbsLevel is a quantization transform coefficient value, and ls and bdShift are parameters derived from the quantization parameter qP.

On the other hand, dependent quantization includes two quantizers with different levels. Using the parities of the intermediate values (AbsLevelPass1 and AbsLevel) of the quantization transform coefficient, four states QState are switched. Then, quantization and inverse quantization are performed in accordance with the QState. Note that scaling corresponding to quantization and inverse quantization using the quantization parameter is performed separately.

QState=QStateTransTable [QState][AbsLevelPass1 [xC][yC]& 1]

TransCoeffLevel [x0][y0][cIdx][xC][yC]=(2*AbsLevel [xC][yC]-(QState>1 ?1:0)*(1-2*coeff_sign_flag [n])

d[x0][y0][cIdx][xC][yC]=(TransCoeffLevel [x0][ y0][cIdx][xC][yC]*1s[xC][yC]+((1<<bdShift)>>1))>>bdShift Here, QState is a state, QStateTransTable [ ] [ ] is a table used for state transition, for example, QStateTransTable [ ] [ ]={{0,2}, {2,0}, {1,3}, {3,1}}.

QState may be derived using the following equation without using QStateTransTable [ ] [ ].

QState=(32040>>((QState<<2)+((AbsLevelPass1 [xC][yC]& 1)<<1))& 3

The value of QState allows different TransCoeffLevels (or d) to be derived even with the same AbsLevel. QState is derived with reference to the last decoded quantization transform coefficient value, and thus compared to typical scalar (inverse) quantization, coding-efficient (inverse) quantization can be achieved utilizing correlation between the coefficients.

sps_dep_quant_enabled_flag in FIG. 9B is a flag indicating whether dependent quantization is enabled in a picture referencing a certain SPS. sps_dep_quant_enabled_flag=0 indicates that dependent transform is disabled. sps_dep_quant_enabled_flag=1 indicates that dependent quantization may be enabled.

ph_dep_quant_enabled_flag in FIG. 9B is a flag indicating whether dependent quantization is enabled in the current picture. ph_dep_quant_enabled_flag=0 indicates that dependent transform is disabled. ph_dep_quant_enabled_flag=1 indicates that dependent quantization is enabled. In a case that ph_dep_quant_enabled_flag is not signalled, the flag is inferred to be 0.

In a regular residual_coding method (RRC), a decoding start position for a non-zero transform coefficient, referred to as the LAST position, is coded so as to be suitable for a case where non-zero transform coefficients are concentrated in some regions of low frequency components, and the low frequency component side with respect to the LAST position is scanned to decode the quantization transform coefficients.

To use sign data hiding and dependent quantization, the RRC unit 30241 derives parameters required for these types of processing such as sum of absolute value of transform coefficients, the state of dependent quantization (QState), and the like. On the other hand, in residual coding using the transform skip mode (TSRC), the non-zero transform coefficients are not concentrated in some regions, and thus the LAST position is not coded and the entire block is scanned to decode the quantization transform coefficients. Sign data hiding and dependent quantization are not used, and the TSRC unit 30242 does not derive the above-described parameters necessary for these types of processing.

However, even in a case of the transform skip mode, the coding efficiency may be better in a case that regular residual coding method is used. For such a case, a regular residual coding method may be utilized for the transform skip mode. For example, slice_ts_residual_coding_disabled_flag illustrated in FIG. 10A may be signalled.

slice_ts_residual_coding_disabled_flag indicates whether residual_ts_coding ( ) corresponding to the TSRC mode is used to decode the prediction error in the block (transform skip block) to which the transform skip is applied in the current slice. slice_ts_residual_coding_disabled_flag=1 indicates that residual_coding( ) corresponding to the RRC mode is used to parse the prediction error in the transform skip block. slice_ts_residual_coding_disabled_flag=0 indicates that residual_ts_coding( ) is used to parse the prediction error in the transform skip block. In a case that slice_ts_residual_coding_disabled_flag is not signalled, the flag is inferred to be 0.

As illustrated in FIG. 10B, in a case of !transform_skip_flag [x0] [y0] [0] || slice_ts_residual_coding_disabled_flag, the processing may be performed by the RRC unit 30241. Otherwise, the processing may be performed by the TSRC unit 30242. In other words, in a case of slice_ts_residual_coding_disabled_flag not being 0 as well as in a case of transform_skip_flag being 0, the transform coefficient (prediction error) may be signalled by the RRC.

Referencing slice_ts_residual_coding_disabled_flag allows the regular residual_coding method (RRC mode) to be used even in the transform skip mode.

Second Embodiment

For slice_ts_residual_coding_disabled_flag, as illustrated in FIG. 13, sps_transform_skip_enabled_flag may be referenced, and in a case of sps_transform_skip_enabled_flag=1, slice_ts_residual_coding_disabled_flag may be signalled. slice_ts_residual_coding_disabled_flag is a flag indicating whether the TSRC mode is used to decode the prediction error in the block to which transform skips is applied in the current slice. Accordingly, in a case that the non-use of the transform skip mode in the SPS is signalled, the TSRC mode is not used, and there is no need to signal slice_ts_residual_coding_disabled_flag. This enables a reduction in code amount and is effective for improving the coding efficiency.

Third Embodiment

Hardware and software implementation costs can be reduced by exclusively operating transform skip and dependent quantization, or, sign_data_hiding and dependent quantization.

As illustrated in FIGS. 14A, 14B and 14C, the RRC unit 30241 may switch dependent quantization among the four states QState with reference to slice_ts_residual_coding_disabled_flag (SYN1401, SYN1402, SYN1404, and SYN-1405). Specifically, QState is updated in a case that ph_dep_quant_enabled_flag is 1 and that slice_ts_residual_coding_disabled_flag is 0 (SYN1401 and SYN1402). Conversely, QState is not updated in a case that ph_dep_quant_enabled_flag is 0 or that slice_ts_residual_coding_disabled_flag is 1. This allows the quantization transform coefficient for transform skip to be decoded in the RRC mode. Thus, even in a case that the transform skip is enabled, the RRC unit 30241 does not perform dependent quantization in a case that slice_ts_residual_coding_disabled_flag=1. The above conditions enable transform skip and dependent quantization to be exclusively operated.

Alternatively, in a case that QState is updated without the use of QStateTransTable [ ] [ ], a variable stateVal may be used.

stateVal=(ph_dep_quant_enabled_flag && !slice_ts_residual_coding_disabled_flag)?32040:0

QState=(stateVal>>((QState<<2)+(AbsLevelPass1 [*xC*][*yC*]& 1)<<1))& 3

In a case that stateVal is 0, QState is constantly 0, meaning that dependent quantization is not performed, thus enabling transform skip and dependent quantization to be exclusively operated.

Additionally, as illustrated in FIGS. 14A, 14B and 14C, slice_ts_residual_coding_disabled_flag may be used to derive the value of signHidden, which determines whether to apply sign data hiding (SYN1403). Specifically, signHidden is set to 0 in a case that ph_dep_quant_enabled_flag is 1, or that pic_sign_data_hiding_enabled_flag is 0 or that slice_ts_residual_coding_disabled_flag is 1.

```
if(ph_dep_quant_enabled_flag
| | !pic_sign_data_hiding_enabled_flag | |
slice_ts_residual_coding_disabled_flag)
    signHidden = 0
  else
    signHidden = (lastSigScanPosSb − firstSigScanPosSb > 3 ?
1 : 0)
```

In this way, in a case that ph_dep_quant_enabled_flag is 0 and that pic_sign_data_hiding_enabled_flag is 1 and that slice_ts_residual_coding_disabled_flag is 0, sign_data_hiding is performed depending on the distribution of non-zero coefficients. The distribution of non-zero coefficients refers to, for example, difference values between firstSigScanPosSb and lastSigScanPosSb. Thus, transform skip and sign_data_hiding can be exclusively operated.

Alternatively, instead of using slice_ts_residual_coding_disabled_flag, the RRC unit 30241 may use transform_skip_flag to exclusively operate transform_skip, sign_data_hiding, and dependent quantization.

As illustrated in FIG. 15, first, the TU decoder 3024 signals transform_skip_flag (SYN1501, SYN1502, and SYN1503) to the RRC unit 30241. Then, as illustrated in FIGS. 16A, 16B and 16C, the RRC unit 30241 updates QState in a case that ph_dep_quant_enabled_flag is 1 and that transform_skip_flag is 0. Otherwise, in a case that ph_dep_quant_enabled_flag is 0 or that slice_ts_residual_coding_disabled_flag is 1, QState is not updated. In this manner, in a case that transform skip is enabled, the RRC unit 30241 does not perform dependent quantization (SYN1601, SYN1602, SYN1604, and SYN1605).

Furthermore, transform_skip_flag may be used to derive the signHidden value. Specifically, the RRC unit 30241 sets signHidden to 0 in a case that ph_dep_quant_enabled_flag is 1 or that pic_sign_data_hiding_enabled_flag is 0 or that transform_skip_flag is 1 (SYN1603).

```
if(ph_dep_quant_enabled_flag
| | !pic_sign_data_hiding_enabled_flag | | transform_skip_flag)
    signHidden = 0
else
    signHidden = (lastSigScanPosSb − firstSigScanPosSb > 3 ?
1 : 0)
```

Such a configuration allows removal of the combination of transform skip, sign_data_hiding, and dependent quantization, and is thus effective for reducing hardware and software implementation costs.

The inverse quantization and inverse transform processing unit 311 scales (inversely quantizes) the quantization transform coefficient input from the entropy decoder 301 to calculate a transform coefficient d [ ] [ ]. The quantization transform coefficient is a coefficient obtained by performing, in coding processing, transform such as a Discrete Cosine Transform (DCT) or a Discrete Sine Transform (DST) on the prediction error to quantize the prediction error. In a case that transform_skip_flag is 0, the inverse quantization and inverse transform processing unit 311 performs an inverse frequency transform such as an inverse DCT or an inverse DST on the scaled transform coefficient d [ ] [ ], and calculates the prediction error res [ ] [ ]. In a case that transform_skip_flag is 1, the inverse quantization and inverse transform processing unit 311 is assumed to be res [x] [y]=d [x] [y]. The inverse quantization and inverse transform processing unit 311 outputs the prediction error to the addition unit 312.

Note that the inverse transform is paired with the transform and that the transform and the inverse transform may be replaced with each other for interpretation. Alternatively, in a case that the inverse transform is referred to as a transform, the transform may be referred to as a forward transform. For example, in a case that an inverse inseparable transform is referred to as an inseparable transform, the inseparable transform may be referred to as a forward inseparable transform. A separable transform is also referred to simply as a transform.

The addition unit 312 adds, for each pixel, the prediction image of the block input from the prediction image generation unit 308 to the prediction error input from the inverse quantization and inverse transform processing unit 311 to generate a decoded image of the block. The addition unit 312 stores the decoded image of the block in the reference picture memory 306 and outputs the decoded image to the loop filter 305.

Configuration of Video Coding Apparatus

Figure 17:
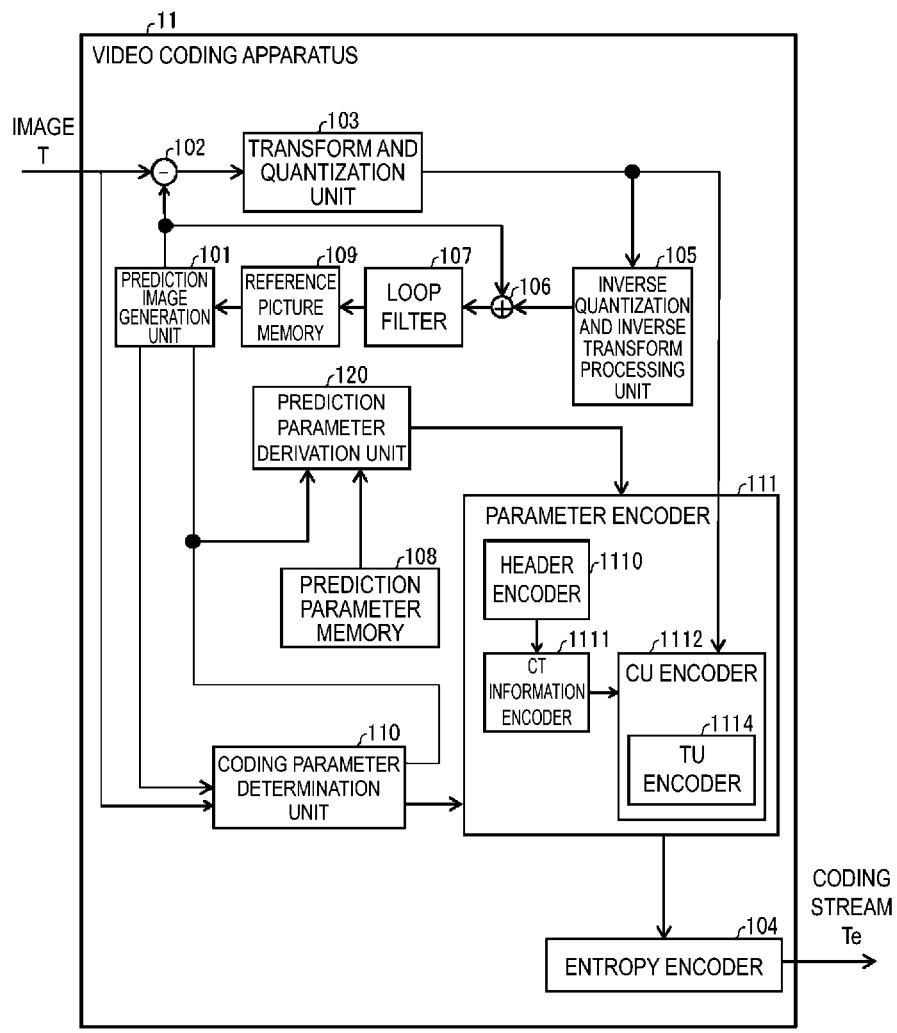
FIG. 17 is a block diagram illustrating a configuration of a video coding apparatus.

Now, a configuration of the video coding apparatus 11 according to the present embodiment will be described. FIG. 17 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit and a frame memory) 108, a reference picture memory (a reference image storage unit and a frame memory) 109, a coding parameter determination unit 110, a parameter encoder 111, and an entropy encoder 104.

The prediction image generation unit 101 generates a prediction image for each of CUs into which each picture of an image T is split. The operation of the prediction image generation unit 101 is the same as that of the prediction image generation unit 308 already described, and the description of the operation is omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and performs quantization to derive a quantization transform coefficient. The transform and quantization unit 103 outputs the quantization transform coefficient to the entropy encoder 104 and the inverse quantization and inverse transform processing unit 105.

The inverse quantization and inverse transform processing unit 105 is the same as the inverse quantization and inverse transform processing unit 311 (FIGS. 10A and 10B) in the video decoding apparatus 31, and the description of the inverse quantization and inverse transform processing unit 105 is omitted. The prediction error calculated is output to the addition unit 106.

To the entropy encoder 104, the quantization transform coefficient is input from the transform and quantization unit 103, and the coding parameter is input from the parameter encoder 111. The coding parameter is, for example, predMode indicating a prediction mode. predMode may be either MODE_INTRA indicating intra prediction or MODE_INTER indicating inter prediction, or MODE_INTRA, MODE_INTER, or MODE_IBC indicating an intra block copy prediction that copies blocks in the picture to obtain a prediction image.

The entropy encoder 104 entropy codes split information, prediction parameters, quantization transform coefficients, and the like to generate and output a coding stream Te.

The parameter encoder 111 includes a header encoder 1110, a CT information encoder 1111, a CU encoder 1112 (prediction mode encoder), and an inter prediction parameter encoder 112 and an intra prediction parameter encoder 113. The CU encoder 1112 further includes a TU encoder 1114.

General operation of each module will now be described. The parameter encoder 111 performs coding processing on header information, split information, prediction information, parameters such as the quantization transform coefficient, and the like.

The CT information encoder 1111 codes QT, MT (BT and TT) splitting information, and the like from the coded data.

The CU encoder 1112 codes CU information, prediction information, TU split flags, CU residue flags, and the like.

The TU encoder 1114 codes the QP update information and the quantization transform coefficient in a case that the TU includes a prediction error.

The CT information encoder 1111 and the CU encoder 1112 supply an inter prediction parameter, an intra prediction parameter, and a syntax element such as a quantization transform coefficient to the entropy encoder 104.

The addition unit 106 adds, for each pixel, the pixel value of the prediction image of the block input from the prediction image generation unit 101 to the prediction error input from the inverse quantization and inverse transform processing unit 105 to generate a decoded image. The addition unit 106 stores the decoded image generated in the reference picture memory 109.

The loop filter 107 applies a deblocking filter, an SAO, and an ALF to the decoded image generated by the addition unit 106. Note that the loop filter 107 need not necessarily include the three types of filters described above, and may include only the deblocking filter, for example.

The SAO is a filter that adds, in units of samples, an offset corresponding to the results of classification, and the ALF is a filter that uses the product sum of the filter coefficient transmitted and the reference image (or the difference between the reference image and the target pixel).

The prediction parameter memory 108 stores the prediction parameter generated by the coding parameter determination unit 110 at a location predetermined for each target picture and for each target CU.

The reference picture memory 109 stores the decoded image generated by the loop filter 107 at a location predetermined for each target picture and for each target CU.

The coding parameter determination unit 110 selects one set among multiple sets of coding parameters. The coding parameter refers to the above-described QT, BT, or TT split information, the prediction parameter, or a parameter to be coded, the parameter being generated in association with the split information and the prediction parameter. The prediction image generation unit 101 generates a prediction image by using the coding parameters.

The coding parameter determination unit 110 calculates, for each of the multiple sets, a RD cost value indicating the magnitude of an amount of information and a coding error. The coding parameter determination unit 110 selects a set of coding parameters of which cost value calculated is a minimum value. With this configuration, the entropy encoder 104 outputs the selected set of coding parameters as the coding stream Te. The coding parameter determination unit 110 stores the determined coding parameters in the prediction parameter memory 108.

Note that parts of the video coding apparatus 11 and the video decoding apparatus 31 in the above-described embodiments may be implemented by a computer and that the parts include, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy encoder 104, the inverse quantization and inverse transform processing unit 105, the loop filter 107, the coding parameter determination unit 110, and the parameter encoder 111. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Additionally, the above-described program may be configured to realize some of the functions described above, and additionally may be configured to realize the functions described above, in combination with a program already recorded in the computer system.

A part or all of each of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or some or all of the function blocks may be integrated into a processor. A circuit integration technique is not limited to the LSI, and may be realized with a dedicated circuit or a general-purpose processor. Furthermore, in a case that advances in semiconductor technology lead to the advent of a circuit integration technology that replaces an LSI, an integrated circuit based on the circuit integration technology may be used.

The embodiment of the present disclosure has been described in detail above referring to the drawings, but the specific configuration is not limited to the above embodiments and various amendments can be made to a design that fall within the scope that does not depart from the gist of the present disclosure.

Application Examples

The above-described video coding apparatus 11 and the video decoding apparatus 31 can be utilized being installed to various apparatuses performing transmission, reception, recording, and reconstruction of videos. Note that, the video may be a natural video imaged by camera or the like, or may be an artificial video (including CG and GUI) generated by computer or the like.

First, the availability of the above-described video coding apparatus 11 and video decoding apparatus 31 for transmission and reception of videos will be described with reference to FIG. 2.

Figure 2:
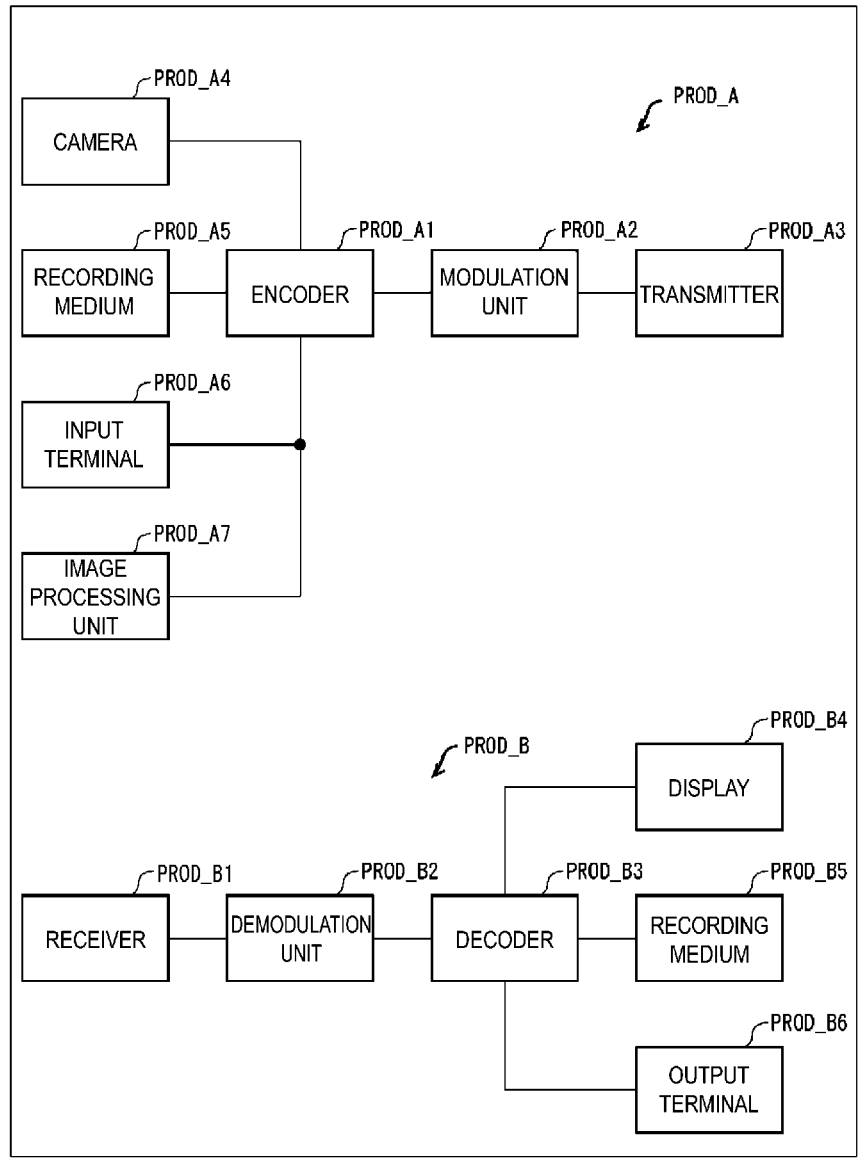
FIG. 2 is a diagram illustrating configurations of a transmitting apparatus equipped with a video coding apparatus and a receiving apparatus equipped with a video decoding apparatus according to the present embodiment. PROD_A indicates a transmitting apparatus equipped with a video coding apparatus, and PROD_B indicates a receiving apparatus equipped with a video decoding apparatus.

FIG. 2 is a block diagram illustrating a configuration of a transmitting apparatus PROD_A equipped with the video coding apparatus 11. As illustrated in FIG. 2, the transmitting apparatus PROD_A includes an encoder PROD_A1 which obtains coded data by coding videos, a modulation unit PROD_A2 which obtains modulation signals by modulating carrier waves with the coded data obtained by the encoder PROD_A1, and a transmitter PROD_A3 which transmits the modulation signals obtained by the modulation unit PROD_A2. The above-described video coding apparatus 11 is utilized as the encoder PROD_A1.

The transmitting apparatus PROD_A may further include a camera PROD_A4 which images videos, a recording medium PROD_A5 which records videos, an input terminal PROD_A6 for inputting videos from the outside, and an image processing unit A7 which generates or processes images, as supply sources of videos to be input into the encoder PROD_A1. Although a configuration in which the transmitting apparatus PROD_A includes all of the above-described constituents is illustrated in FIG. 2, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the encoder PROD_A1.

FIG. 2 is a block diagram illustrating a configuration of a receiving apparatus PROD_B equipped with the video decoding apparatus 31. As illustrated in FIG. 2, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-described video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although a configuration in which the receiving apparatus PROD_B includes all of the above-described constituents is illustrated in FIG. 2, some of the constituents may be omitted.

Note that the recording medium PROD_B5 may record videos which are not coded, or may record videos which are coded in a coding scheme for recording different from a coding scheme for transmission. In the latter case, an encoder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receiver) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone, or the like) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Now, the availability of the above-described video coding apparatus 11 and video decoding apparatus 31 for recording and reconstruction of videos will be described with reference to FIG. 3.

Figure 3:
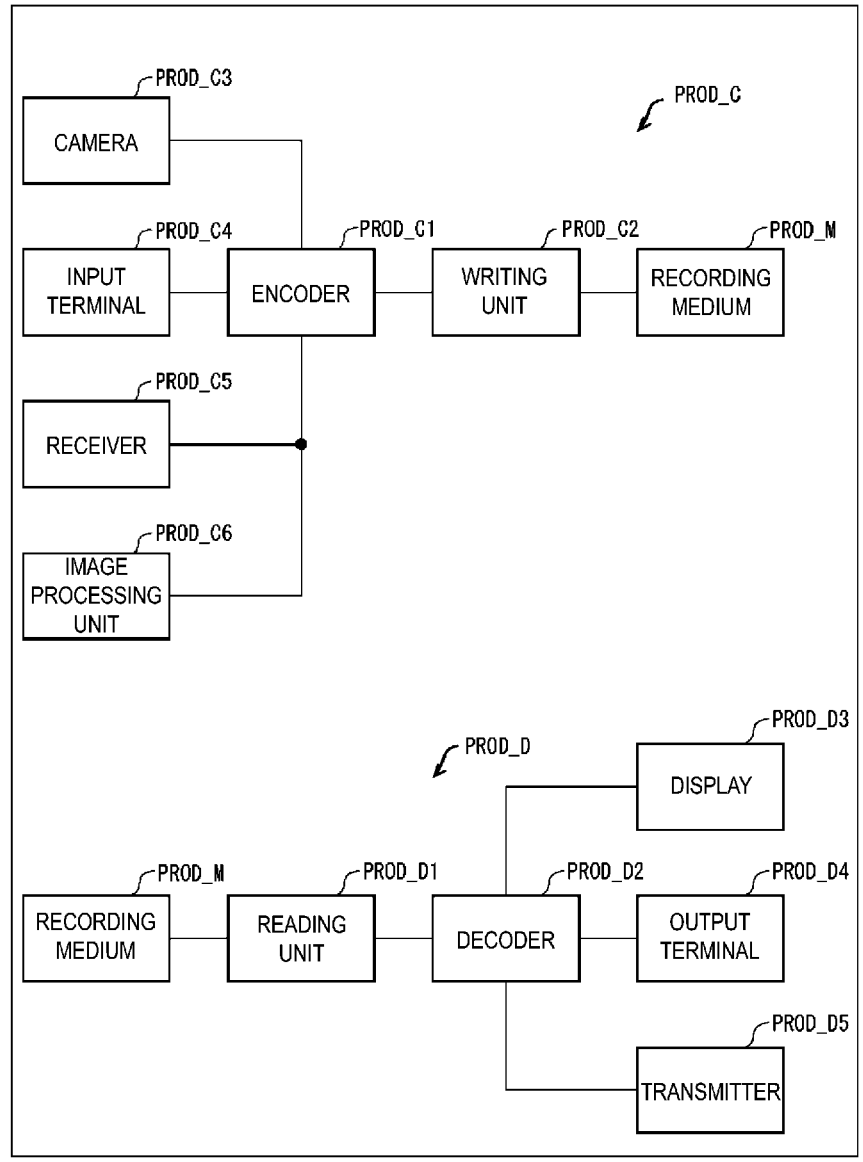
FIG. 3 is a diagram illustrating configurations of a recording apparatus equipped with a video coding apparatus and a reproducing apparatus equipped with a video decoding apparatus according to the present embodiment. PROD_C indicates a recording apparatus equipped with a video coding apparatus, and PROD_D indicates a reproducing apparatus equipped with a video decoding apparatus.

FIG. 3 is a block diagram illustrating a configuration of a recording apparatus PROD_C equipped with the above-described video coding apparatus 11. As illustrated in FIG. 3, the recording apparatus PROD_C includes an encoder PROD_C1 that obtains coded data by coding a video, and a writing unit PROD_C2 that writes the coded data obtained by the encoder PROD_C1 in a recording medium PROD_M. The above-described video coding apparatus 11 is utilized as the encoder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the encoder PROD_C1. Although a configuration in which the recording apparatus PROD_C includes all of the above-described constituents is illustrated in FIG. 3, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the encoder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

Additionally, FIG. 3 is a block diagram illustrating a configuration of a reconstruction apparatus PROD_D equipped with the above-described video decoding apparatus 31. As illustrated in FIG. 3, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-described video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although a configuration in which the reconstruction apparatus PROD_D includes all of the above-described constituents is illustrated in FIG. 3, some of the constituents may be omitted.

Note that the transmitter PROD_D5 may transmit a video which is not coded or may transmit coded data coded in the coding scheme for transmission different from a coding scheme for recording. In the latter case, an encoder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

In addition, each block of the above-described video decoding apparatus 31 and the video coding apparatus 11 may be realized by hardware using a logical circuit formed on an integrated circuit (IC chip) or may be realized by software by using a Central Processing Unit (CPU).

In the latter case, each of the above-described apparatuses includes a CPU that executes a command of a program to implement each of functions, a Read Only Memory (ROM) that stores the program, a Random Access Memory (RAN) to which the program is loaded, a storage apparatus (recording medium), such as a memory, that stores the program and various kinds of data, and the like. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape, and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc(DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

INDUSTRIAL APPLICABILITY

The embodiments of the present disclosure can be preferably applied to a video decoding apparatus that decodes coded data in which image data is coded, and a video coding apparatus that generates coded data in which image data is coded. The embodiments of the present disclosure can be preferably applied to a data structure of coded data generated by the video coding apparatus and referred to by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A decoder for decoding image data, the decoder comprising:
   a header decoder that decodes
      (i) a dependent quantization flag specifying whether dependent quantization is used, based on a value of a dependent quantization enabled flag specifying whether the dependent quantization is enabled, and
      (ii) a transform skip residual coding disabled flag, specifying a residual coding is used to parse residual samples of a transform skip block for a current slice or a residual transform skip coding is used to parse residual samples of a transform skip block for a current slice, based on a value of a transform skip enabled flag specifying whether a transform skip flag may be present in a transform unit syntax;
   a transform unit (TU) decoder that decodes the transform skip flag, specifying whether a transform is applied to an associated block or not, based on the value of the transform skip enabled flag; and
   an inverse quantization and inverse transform processing circuit that derives a transform coefficient by using a scaling factor,
   wherein:
   in a case that a value of the transform_skip_flag is equal to false or a value of the transform skip residual coding disabled flag is equal to true, the residual coding is used,
   otherwise, the residual transform skip coding is used, and
   in a case that (i) a value of dependent quantization flag is equal to true and (ii) the value of the transform_skip_flag is equal to false, the scaling factor is derived by using a first equation $ls[x][y]=(m[x][y]*levelScale[rectNonTsFlag][(qP+1)\%6])<<((qP+1)/6)$, and
   in a case that (i) the value of dependent quantization flag is equal to false and (ii) the value of the transform_skip_ flag is equal to true, the scaling factor is derived by using a second equation $ls[x][y]=(m[x][y]*levelScale[rectNonTsFlag][qP\%6])<<(qP/6)$, wherein the ls represents the scaling factor, the m represents a quantization matrix, and the qP represents a quantization parameter.

2. A encoder for encoding image data, the encoder comprising:
   a header encoder that encodes
      (i) a dependent quantization flag specifying whether dependent quantization is used, based on a value of a dependent quantization enabled flag specifying whether the dependent quantization is enabled, and
      (ii) a transform skip residual coding disabled flag, specifying a residual coding is used to parse residual samples of a transform skip block for a current slice or a residual transform skip coding is used to parse residual samples of a transform skip block for a current slice, based on a value of a transform skip enabled flag specifying whether a transform skip flag may be present in a transform unit syntax;
   a transform unit (TU) encoder that encodes the transform skip flag, specifying whether a transform is applied to an associated block or not, based on the value of the transform skip enabled flag; and
   an inverse quantization and inverse transform processing circuit that derives a transform coefficient by using a scaling factor,
   wherein:
   in a case that a value of the transform_skip_flag is equal to false or a value of the transform skip residual coding disabled flag is equal to true, the residual coding is used,
   otherwise, the residual transform skip coding is used, and
   in a case that (i) a value of dependent quantization flag is equal to true and (ii) the value of the transform_skip_ flag is equal to false, the scaling factor is derived by using a first equation $ls[x][y]=(m[x][y]*levelScale[rectNonTsFlag][(qP+1)\%6])<<((qP+1)/6)$, and
   in a case that (i) the value of dependent quantization flag is equal to false and (ii) the value of the transform_skip_ flag is equal to true, the scaling factor is derived by using a second equation $ls[x][y]=(m[x][y]*levelScale[rectNonTsFlag][qP\%6])<<(qP/6)$, wherein the ls represents the scaling factor, the m represents a quantization matrix, and the qP represents a quantization parameter.

3. A method for decoding image data, the method including:
   decoding (i) a dependent quantization flag specifying whether dependent quantization is used, based on a value of a dependent quantization enabled flag specifying whether the dependent quantization is enabled, and (ii) a transform skip residual coding disabled flag, specifying a residual coding is used to parse residual samples of a transform skip block for a current slice or a residual transform skip coding is used to parse residual samples of a transform skip block for a current slice, based on a value of a transform skip enabled flag specifying whether a transform_skip_flag may be present in a transform unit syntax;
   decoding the transform_skip_flag, specifying whether a transform is applied to an associated block or not, based on the value of the transform skip enabled flag; and
   deriving a transform coefficient by using a scaling factor,
   wherein:
   in a case that a value of the transform_skip_flag is equal to false or a value of the transform skip residual coding disabled flag is equal to true, the residual coding is used,
   otherwise, the residual transform skip coding is used, and
   in a case that (i) a value of dependent quantization flag is equal to true and (ii) the value of the transform_skip_ flag is equal to false, the scaling factor is derived by using a first equation $ls[x][y]=(m[x][y]*levelScale[rectNonTsFlag][(qP+1)\%6])<<((qP+1)/6)$, and
   in a case that (i) the value of dependent quantization flag is equal to false and (ii) the value of the transform_skip_ flag is equal to true, the scaling factor is derived by using a second equation $ls[x][y]=(m[x][y]*levelScale[rectNonTsFlag][qP\%6])<<(qP/6)$, wherein the ls represents the scaling factor, the m represents a quantization matrix, and the qP represents a quantization parameter.

* * * * *